US012342751B1

(12) United States Patent
Aghli

(10) Patent No.: US 12,342,751 B1
(45) Date of Patent: Jul. 1, 2025

(54) ADAPTIVE CONTROLLER

(71) Applicant: Scythe Robotics, Inc., Longmont, CO (US)

(72) Inventor: Sina Aghli, Broomfield, CO (US)

(73) Assignee: Scythe Robotics, Inc., Longmont, CO (US)

( * ) Notice: Subject to any disclaimer, the term of this patent is extended or adjusted under 35 U.S.C. 154(b) by 400 days.

(21) Appl. No.: 17/542,237

(22) Filed: Dec. 3, 2021

Related U.S. Application Data

(60) Provisional application No. 63/285,914, filed on Dec. 3, 2021.

(51) Int. Cl.
*A01D 34/00* (2006.01)
*A01D 34/66* (2006.01)
*A01D 101/00* (2006.01)
*B60W 50/00* (2006.01)
*B60W 60/00* (2020.01)
*G05D 1/00* (2024.01)

(52) U.S. Cl.
CPC ....... *A01D 34/008* (2013.01); *B60W 50/0098* (2013.01); *B60W 60/0025* (2020.02); *G05D 1/0223* (2013.01); *G05D 1/0276* (2013.01); *A01D 34/66* (2013.01); *A01D 2101/00* (2013.01); *B60W 2050/0022* (2013.01); *B60W 2520/10* (2013.01); *B60W 2520/12* (2013.01); *B60W 2530/10* (2013.01); *B60W 2556/45* (2020.02); *B60W 2720/10* (2013.01); *B60W 2720/12* (2013.01)

(58) Field of Classification Search
CPC ........................... G05D 1/0223; G05D 1/0276
See application file for complete search history.

(56) References Cited

U.S. PATENT DOCUMENTS

| | | | | |
|---|---|---|---|---|
| 2017/0188510 | A1* | 7/2017 | Einecke | G06V 20/56 |
| 2020/0275605 | A1* | 9/2020 | Chen | G01S 19/14 |
| 2020/0363796 | A1* | 11/2020 | Muro | G05D 1/0219 |
| 2021/0046923 | A1* | 2/2021 | Olson | B60W 30/095 |
| 2022/0039313 | A1 | 2/2022 | Morrison et al. | |
| 2022/0091613 | A1 | 3/2022 | Alban et al. | |
| 2022/0111737 | A1* | 4/2022 | Yang | H02P 21/12 |

OTHER PUBLICATIONS

Yutaka Kanayama, Yoshihiko Kimura, Fumio Miyazaki, and Tetsuo Noguchi. A stable tracking control method for an autonomous mobile robot. In Proceedings., IEEE International Conference on Robotics and Automation, pp. 384-389, 7 pages, IEEE, 1990, 6 pages.

\* cited by examiner

*Primary Examiner* — Jaime Figueroa
*Assistant Examiner* — Jerrod Irvin Davis
(74) *Attorney, Agent, or Firm* — Chang & Hale LLP

(57) ABSTRACT

Techniques and architectures for controlling movement of a system along a desired path in an efficient manner are discussed herein. For example, an autonomous lawn mower can be configured to determine a target state for the autonomous lawn mower indicating a target position, orientation, linear velocity, rotational velocity, etc. The autonomous lawn mower can determine a difference between a current state of the autonomous lawn mower and the target state. Based on the difference, the autonomous lawn mower can determine an amount of force/torque and control the autonomous lawn mower to move based on the amount of force/torque, which can cause the autonomous lawn mower to realign with a target state.

19 Claims, 12 Drawing Sheets

ADAPTIVE CONTROLLER

CROSS-REFERENCE TO RELATED APPLICATION(S)

This application claims priority to U.S. Provisional Application No. 63/285,914, filed Dec. 3, 2021, and entitled ADAPTIVE CONTROLLER, the entire contents of which are incorporated herein by reference.

BACKGROUND

Autonomous systems are configured to perform various tasks within an environment. For example, data from a camera, navigation system, and/or other sensors may be used to establish a trajectory, such as a mowing pattern when used in autonomous lawn mowers, to follow. If the system diverts from the trajectory, for example, due to environment conditions, tolerances in components, inconsistent functioning of components, inaccurate sensor readings, or otherwise, the system may recalculate the trajectory. In some cases, the system may need to recalculate the trajectory multiple times, which can consume substantial resources and/or time.

BRIEF DESCRIPTION OF THE DRAWINGS

Various examples are depicted in the accompanying drawings for illustrative purposes and should in no way be interpreted as limiting the scope of the disclosure. In addition, various features of different disclosed examples can be combined to form additional examples, which are part of this disclosure. In the figures, the left-most digit(s) of a reference number identifies the figure in which the reference number first appears. Throughout the drawings, reference numbers may be reused to indicate correspondence between reference elements.

DETAILED DESCRIPTION

Figure 1:
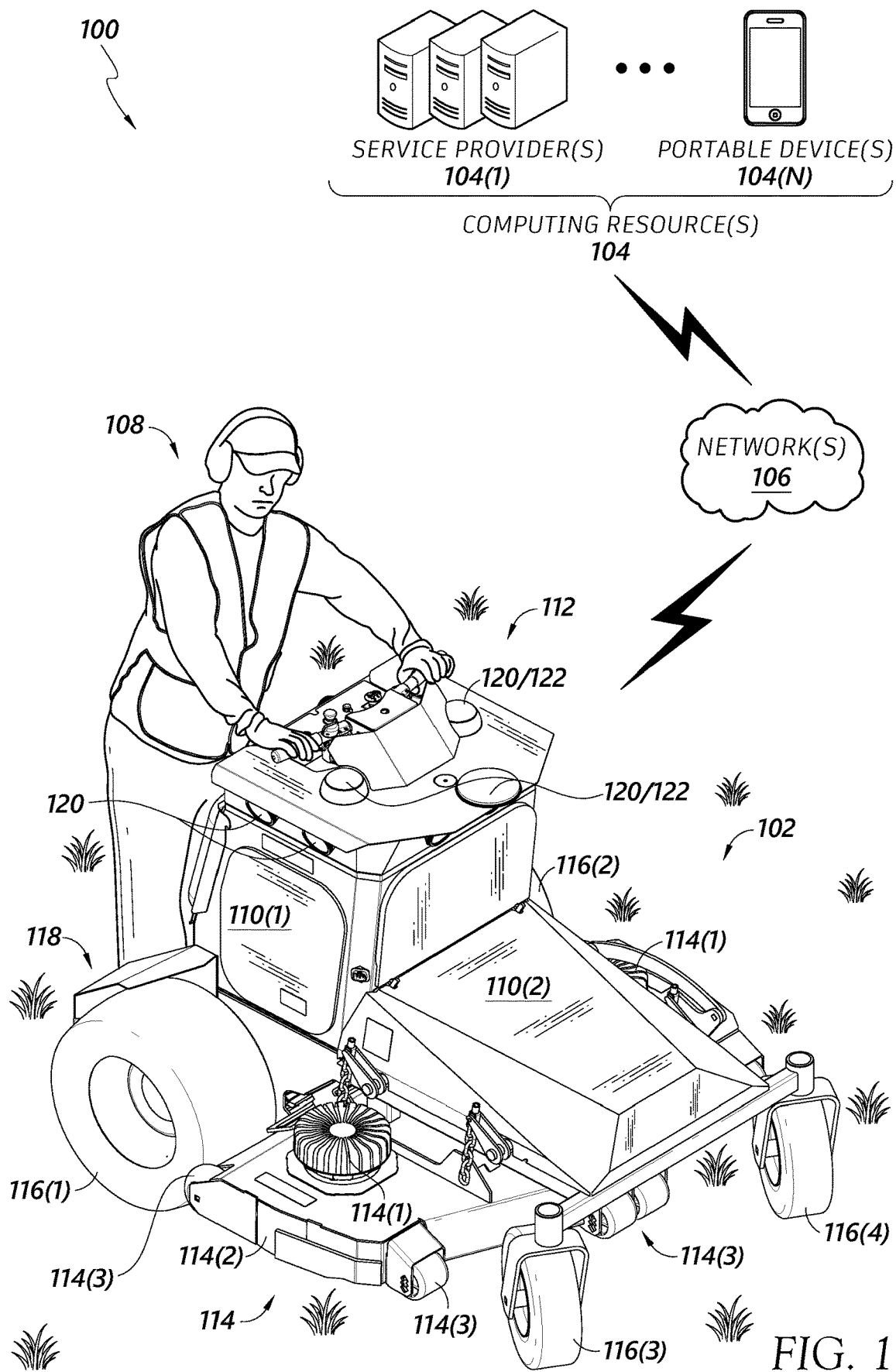
FIG. 1 illustrates an example architecture to implement various techniques/devices discussed herein.

This disclosure describes architectures and techniques for controlling movement of autonomous systems along desired paths in an efficient manner. For example, an autonomous lawn mower can be configured to perform processing to determine a target trajectory/state for the lawn mower to follow. A drive unit of the lawn mower can then be controlled in an attempt to follow the target trajectory. The lawn mower can monitor a current state of the lawn mower to detect a deviation from the target trajectory (as may be caused by, for example, environmental conditions, sensor errors, component errors, and the like) and, if such condition is detected, provide adjustments to the drive unit to return to the target trajectory (or recalculate the target trajectory, in some cases). In some instances, an adjustment can be made to control the drive unit of the lawn mower without performing processing to recalculate a new target trajectory. In other words, the lawn mower can make adjustments to the movement of the lawn mower without having to replan a target trajectory each time a deviation from the target trajectory is detected.

In one illustration, an autonomous lawn mower can include a controller configured to maintain the lawn mower on a target trajectory by providing adjustment signals to a drive unit. The controller can include a kinematics component configured to receive target data from a planner indicating one or more target states for the lawn mower (e.g., a target position, orientation/heading, linear/rotational velocity, etc.). The kinematics component can also receive current state data indicating a state of the lawn mower (e.g., a current position, orientation/heading, linear/rotational velocity, etc.). The kinematics component can determine if the current state is different than the target state, and if so, generate compensation data indicating a compensation speed and/or rotational rate. The controller can also include a dynamic component configured to use the compensation data and the current state data to determine a control signal for controlling movement of the lawn mower. The control signal can indicate an amount of force/torque for a drive unit to apply to return the lawn mower to the target trajectory. The kinematics component and/or the dynamic component can each be implemented in the context of a loop, wherein updated state data for the lawn mower is provided to the respective component.

In examples, the architectures and techniques can be configured to exponentially converge a current state of an autonomous system to a target trajectory. Further, in examples, the architectures and techniques can be stable according to certain algorithms/theories, such as the Lyapunov stability theory, contraction analysis, and so on. Thus, the architectures and techniques can minimize/reduce reliance on certain computational resources, minimize/reduce computational time associated with planning/replanning a trajectory/state, and/or otherwise maintain an autonomous system on a desired trajectory in an efficient/effective manner.

The techniques and architectures are discussed herein in the context of autonomous systems, such as an autonomous lawn mower. However, the techniques and architectures can be implemented for other types of equipment/devices, such as other landscaping equipment (e.g., autonomous weed-whackers, trimming devices, edgers, irrigation/watering/sprinkler systems, etc.), excavation equipment, and/or other type of autonomous systems.

FIG. 1 illustrates an example architecture 100 in which the techniques/devices described herein may be implemented. The architecture 100 includes a lawn mower 102 configured to communicate with one or more computing resources 104 (also referred to as "the computing resource 104") via one or more networks 106 (also referred to as "the network 106"). The lawn mower 102 and/or the computing resource 104 can individually and/or collectively perform various operations discussed herein. For example, the lawn mower 102 can perform operations locally with or without the assistance of the computing resource 104. The computing resource 104 can be local to and/or remote from the lawn mower 102. The one or more networks 106 can include one or more personal area networks (PAN), local area networks (LANs), wide area networks (WANs), Internet area networks (IANs), cellular networks, the Internet, etc. Although example devices are illustrated in the architecture 100, any of such devices may be eliminated/not implemented. In one example, the lawn mower 102 can implement various techniques discussed herein without communicating with the computing resource 104.

The computing resource 104 can be implemented as one or more computing devices. For example, the computing resource 104 can include one or more service providers 104(1) that include one or more computing devices, such as one or more servers, one or more desktop computers, one or more laptops computers, or any other type of device configured to process data. In some examples, the one or more computing devices of the one or more service providers 104(1) are configured in a cluster, data center, cloud computing environment, or a combination thereof. In some examples, the one or more computing devices are implemented as a remote computing resource that is located remotely to the lawn mower 102. In other examples, the one or more computing devices are implemented as local resources that are located locally near and/or a component of the lawn mower 102. Alternatively, or additionally, the computing resource 104 can include one or more portable devices 104(N), such as one or more laptops computers, smartphones, electronic reader devices, mobile handsets, personal digital assistants, portable navigation devices, portable gaming devices, tablet computers, wearable devices (e.g., a watch), portable media players, or other types of portable computing devices. Further, the computing resource 104 can include other types of computing devices, such as one or more desktop computers, televisions, set-top boxes, cameras, security systems, home-based computer systems, projectors, and so on.

The lawn mower 102 can be configured to operate in various modes/states, such as a manual mode/state, an autonomous mode/state, a remote-control mode/state, and/or another operating mode/state, which can be set by a user and/or the lawn mower 102. In a manual mode, the lawn mower 102 can generally operate based on input from a user/operator 108 while the user 108 is positioned on and/or within proximity to the lawn mower 102. For example, the user 108 can be positioned on the lawn mower 108 (as illustrated in FIG. 1) and provide input to navigate the lawn mower 102 and/or control various components of the lawn mower 102. In some examples of implementing a manual mode, the lawn mower 102 can use data from one or more sensors to assist in driving and/or overriding input from the user 108. In some instances, such manual mode can be referred to a co-robotics mode/co-robotics manual mode, since some aspects are controlled by a user and some aspects are controlled autonomously. Additionally, or alternatively, co-robotics may also refer to those instances in which the robot augments tasks performed by a human (e.g., when landscaping, the autonomous mower may mow the lawn while a human performs edging, weed whacking, or other tasks). In an autonomous mode, the lawn mower 102 can generally operate based on data from one or more sensors (and based on relatively little or no human input). In some cases, the lawn mower 102 can be referred to as the autonomous lawn mower 102 since the lawn mower 102 is capable of being operated in an autonomous mode. In a remote-control mode, the lawn mower 102 can operate based on user input from a user that employs the computing resource 104. For example, a user can implement the portable device 104(N) to navigate the lawn mower 102 and/or control various components of the lawn mower 102. The user can be located locally, such as within sight of the lawn mower 102, or remotely, such as out-of-sight of the lawn mower 102 at a remote location.

In some cases, the user 108 can operate the lawn mower 102 in a manual mode to set up or otherwise establish an area for the lawn mower 102 to mow in an autonomous mode. For example, the user 108 can manually control the lawn mower 102 (as illustrated in FIG. 1) to define a perimeter of an area to be mowed, and thereafter, transition the lawn mower 102 to an autonomous mode to mow the area. Further, in some cases, the user 108 can operate the lawn mower 102 in a manual mode to navigate/mow an area that is difficult/inefficient to navigate/mow in an autonomous mode, such as a relatively small grass section in a parking lot or other environment, areas including obstacles that are difficult to navigate around, and so on. Moreover, the user 108 can operate the lawn mower 102 in a manual mode in other instances.

In one or more of the modes, the lawn mower 102 can generate signals/control signals to control, for example, a speed for the lawn mower 102, a torque to be applied to a wheel(s), a braking of a wheel(s), a steering angle, steering angle rate, a blade height, a blade speed for a blade, etc. For example, in a manual mode, the lawn mower 102 can receive input from a user and generate signals to control the lawn mower 102, while in an autonomous mode the lawn mower 102 can generate signals to control the lawn mower 102 based at least in part on sensor data received.

As shown in FIGS. 1 and 2A-2C, the lawn mower 102 can include a frame/housing structure 110 configured to attach/couple to one or more components. For example, the lawn mower 102 can include a control interface 112 configured to receive and/or provide output to the user 108, a blade/cutting assembly 114 configured to cut grass or other surface/objects, wheels 116 configured to drive/navigate the lawn mower 102, a platform 118 (shown in more detail in FIG. 2C) for the user 108 to stand/sit on, one or more sensors 120, one or more communication devices/interfaces 122, and/or other components discussed herein. Elements labeled 120/122 in the figures indicate that the element can be a sensor and/or communication device. The frame/housing structure 110 can include, among other things, a tower/vertical portion 110(1) (also referred to as "the podium 110(1)") and a hood/horizontal portion 110(2). In some instances, the tower/vertical portion 110(1) houses one or more computing resources, storage resources, power units, sensors, and/or other components for the lawn mower 102 (which may be more sensitive to environmental conditions). However, one or more of components of the lawn mower 102 can be distributed differently in the tower/vertical portion 110(1) and/or the hood/horizontal portion 110(2).

The control interface/panel 112 can be disposed at a top of the tower/vertical portion 110(1) (also referred to as "the tower structure 110"). The control interface 112 can include one or more input/output (I/O) devices (also referred to as "one or more input controls") to interface with the user 108, such as to receive input from the user 108 and/or provide output to the user 108. The control interface 112 can also include one or more features to assist in stabilizing the user 108 while the user 108 operates the lawn mower 102, such as from a standing position on the back of the lawn mower 102, as illustrated in FIG. 1. In some cases, the control interface 112 is removable/detachable from the lawn mower 102, while in other cases the control interface 112 is fixed/integral with the rest of the frame structure 110.

The blade assembly/deck 114 can include one or more blades/cutting elements (not illustrated) configured to cut grass or other objects to a relatively even height relative to a ground surface. In some cases, a blade is operated in a revolving manner around an axis, while in other cases a blade is implemented in a back-and-forth manner and/or another manner. The blade assembly 114 can include one or more actuators to control rotation/movement of the blades and/or to raise/lower the blade assembly 114/blades relative to a ground surface. The blades can be driven independently or in a cooperative manner using one or more motors 114(1). Further, the blades can be driven independently of an actuator/motor that drives the lawn mower 102, such that a speed of the blades and a speed of the lawn mower 102 can be independently controlled (e.g., the speed of the lawn mower 102 can be adjusted without affecting the rotational speed of the blades). The blade assembly 114 can also include a housing/guard 114(2) configured to protect users or other objects from contacting the blades, such as on the top and sides of the blades. Further, the blade assembly 114 can include wheels 114(3) to assist in moving the blade assembly 114 over a surface when the blade assembly 114 is in a lowered/operating state.

The one or more wheels 116 can be controlled to propel the lawn mower 102 over a surface. In this example, the wheels 116(1) and 116(2) are implemented as the drive wheels for the lawn mower 102, wherein torque is applied to the wheels 116(1)/116(2) to drive the lawn mower 102. The wheels 116(1)/116(2) can be independently or cooperatively operated to move the lawn mower 102, which can include applying different amounts of torque to the wheels 116(1) and 116(2). Here, the wheels 116(2) and 116(3) are implemented as casters/un-driven wheels. Although a particular number of wheels are illustrated in this example, the lawn mower 102 can include any number of wheels, with any number of the wheels being drive wheels. Further, the wheels 116 can be implemented with other mechanisms, such as tracks or other movement members.

Figure 2A:
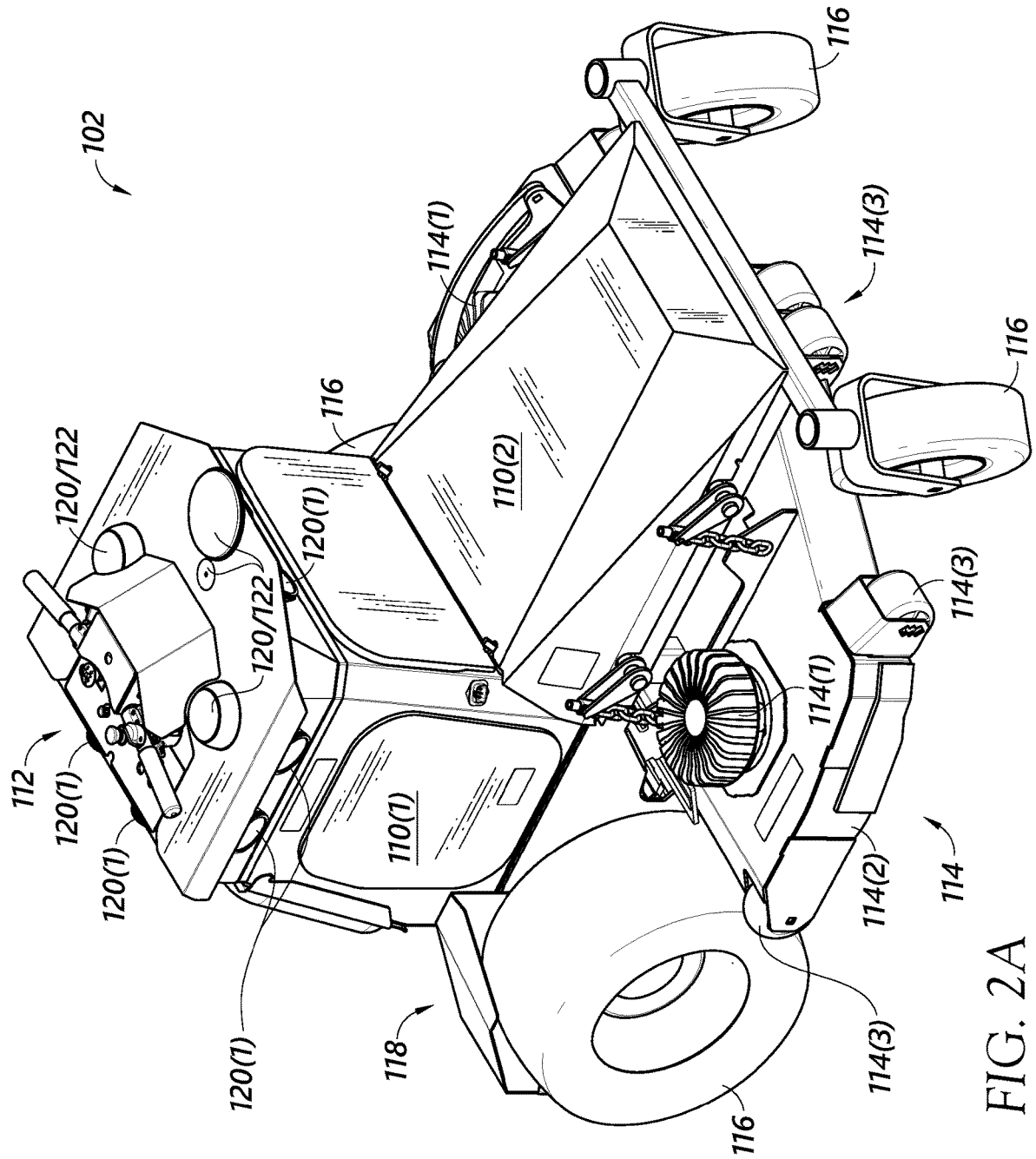
FIG. 2A illustrates a perspective view of the lawn mower of FIG. 1.
Figure 2B:
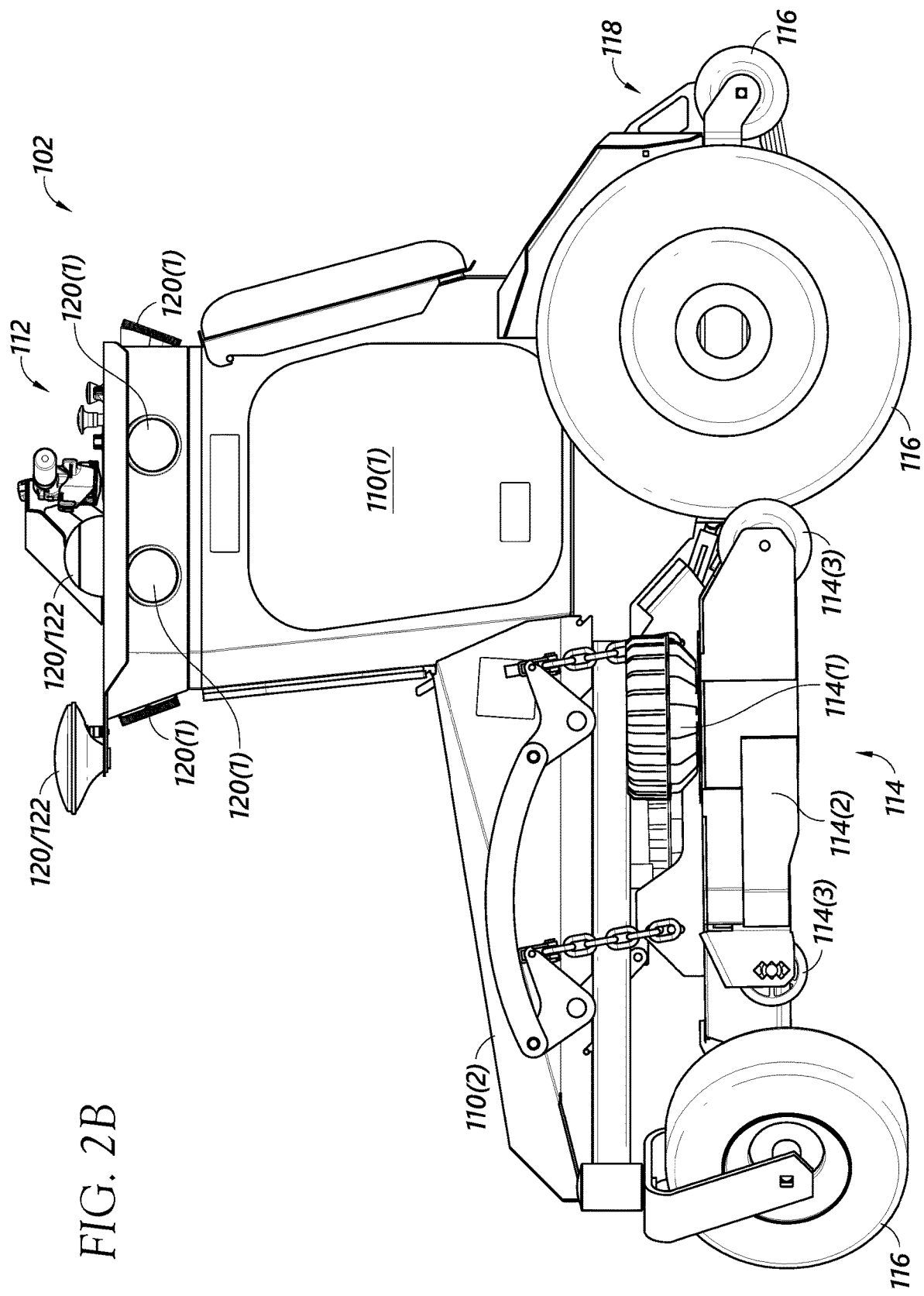
FIG. 2B illustrates a side view of the lawn mower of FIG. 1.
Figure 2C:
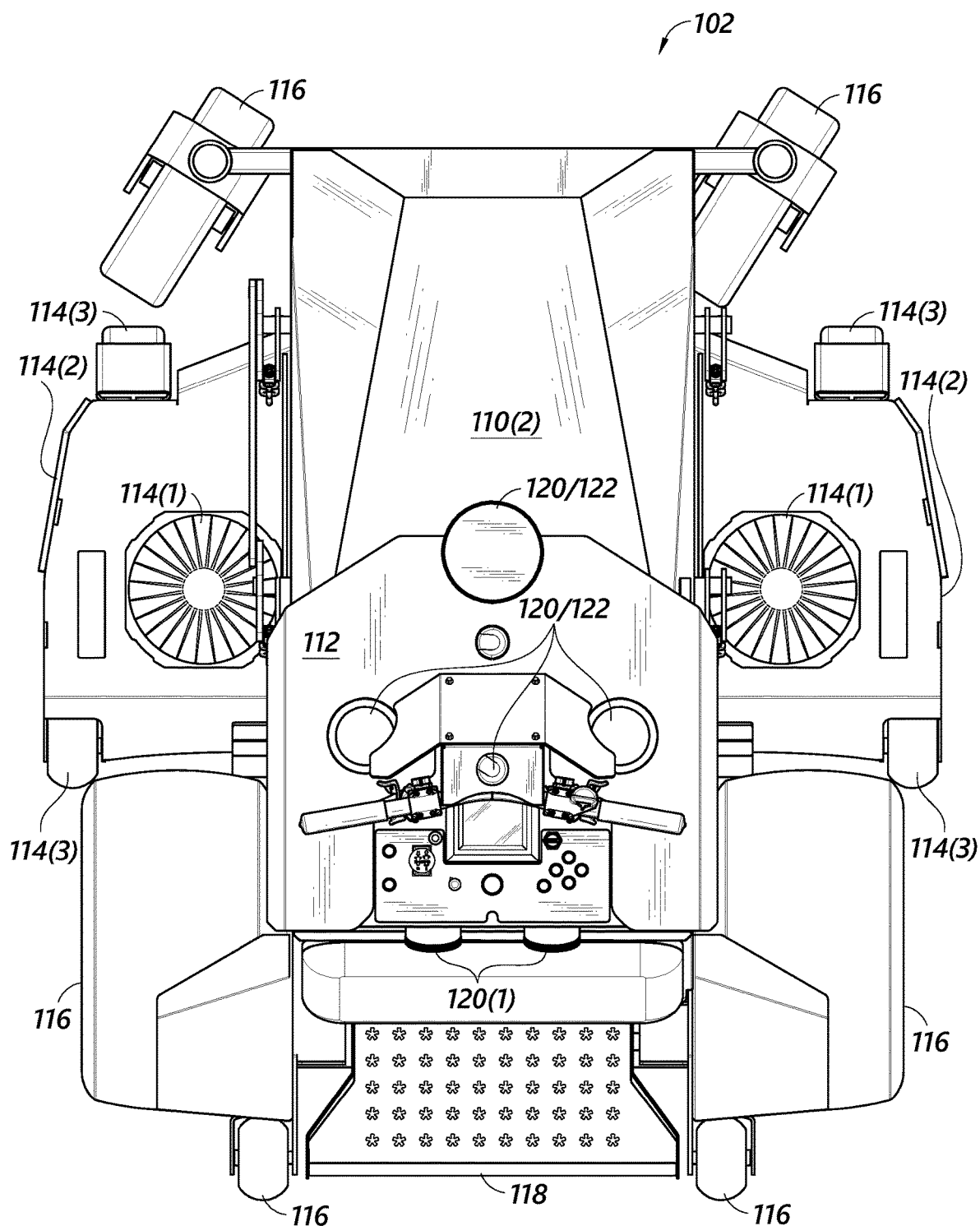
FIG. 2C illustrates a top view of the lawn mower of FIG. 1.

The platform 118 can include a plate or other structure for a user to stand/sit while controlling the lawn mower 102 using the control interface 112, as shown in FIG. 2C. In this example, the platform 118 is attached to the frame structure 110 in a fixed manner. However, the platform 118 can be coupled to the frame structure 110 with a coupling/linkage that allows the platform 118 to be moved at least somewhat freely/independently of the frame structure 110. For example, the platform 118 can be disposed/positioned a distance behind the rest of the lawn mower 102 on a set of wheels with a linkage/coupling that connects the platform 118 to the rest of the frame structure 110. Here, the platform 118 can be pulled behind the lawn mower 102.

The one or more sensors 120 can be configured to detect one or more conditions/events/features relating to an environment. In examples, the one or more sensors 120 can comprise one or more image sensors 120(1) (e.g., RGB cameras, monochrome cameras, stereo cameras, depth cameras/sensors, infrared cameras, ultraviolet cameras, RGB-D cameras, IR cameras, etc.), inertial measurement units (IMUs), radar, lidar, accelerometers, gyroscopes, magnetometers, satellite-based navigation system (e.g., Global Navigation Satellite System (GNSS), such as global positioning system (GPS)), ultrasonic transducers (e.g., SONAR), wheel encoders, thermal imagers, ambient light sensors, time-of-flight sensors, barometers, bolometers, pyrometers, proximity sensors (which can include image sensors, in some cases), pressure sensors, and so on. In examples, two or more image sensors 120(1) can have differing fields of view (e.g., wide and narrow) and/or have an associated baseline. In this example, multiple image sensors 120(1) are positioned at the top of and around the vertical portion 110(1). Environment features, including depth estimates, can be determined based on multi-view geometry techniques of sensor data from the multiple image sensors and/or otherwise provided with depth sensors provided. In some instances, a proximity/pressure sensor is disposed in the control interface 112, such as within a handle, input control assembly, etc. to determine if a user is gripping the lawn mower 102. Further, in some instances, a proximity/pressure sensor can be disposed in the platform 118 to detect if the user is operating the lawn mower 102. The one or more sensors 120 can be disposed about the lawn mower 102 at various poses (i.e., position and/or orientations) determined to optimize a field of view, such as at various locations on the frame/housing structure 110, blade assembly 114, wheels 118, control interface 112, and so on. Although the figures illustrate sensors 120 located at particular locations, the sensors 120 can be positioned at other locations on the lawn mower 102. Moreover, additional sensors can be positioned on the lawn mower 102 that those illustrated.

The one or more communication devices/interfaces 122 can be configured to communicate over one or more wireless/wired networks. For example, the one or more communication devices/interfaces 122 can include communication circuitry, antennas, and/or other components configured to send/receive data in a wireless or wired manner over the one or more networks 106. In some examples, the one or more communication devices 122 can implement a wireless technology, such as Bluetooth, Wi-Fi, near field communication (NFC), or the like. In various examples, the lawn mower 102 may comprise a plurality of communication devices 122 having differing modes (e.g., one or more cellular antennas and one or more Wi-Fi antennas).

Figure 3:
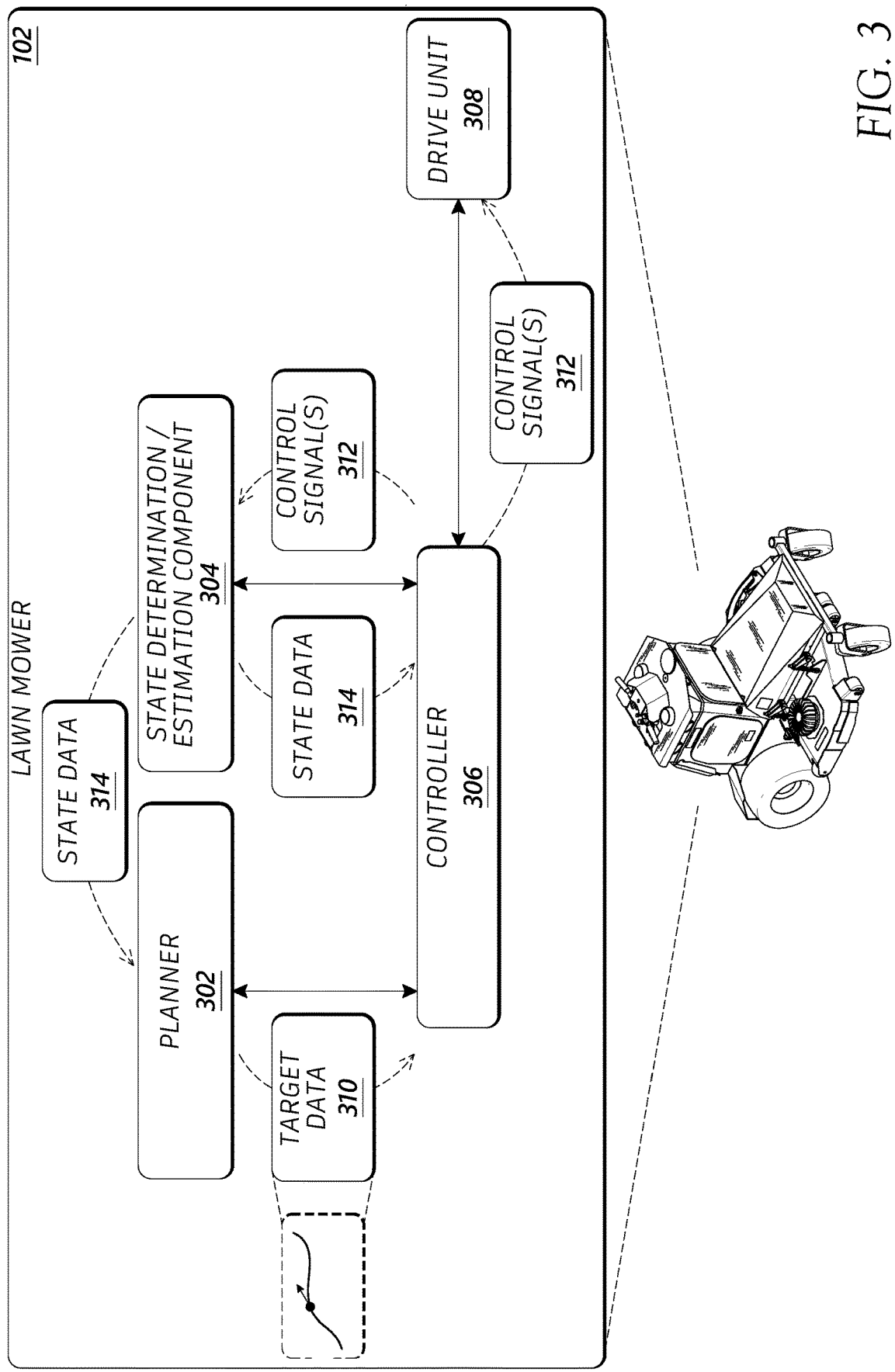
FIG. 3 illustrates example components that can be implemented on the lawn mower of FIG. 1 to control movement of the lawn mower according to one or more examples.

FIG. 3 illustrates example components that can be implemented on the lawn mower 102 to control movement of the lawn mower 102. For example, the components can be configured to move the lawn mower 102 autonomously or semi-autonomously within an environment, wherein the lawn mower 102 seeks to follow one or more target trajectories associated with a coverage plan (e.g., to traverse/mow an area). Although various techniques are discussed in the context of autonomous/semi-autonomous movement, the techniques can similarly be implemented in the context of other modes of operation, such as some manual/user operation modes that may rely at least in part on a target trajectory (e.g., aiding a user to maintain straight paths while operating the machine).

In this example, the lawn mower 102 includes a planner 302, a state determination/estimation component 304, a controller 306, and a drive unit 308. One or more of the components 302-306 (and/or 308) can include executable instructions that, when executed by processing/control circuitry, cause the processing circuitry to perform various operations discussed herein. For example, one or more of the components 302-306 (and/or 308) can include software/firmware modules. Further, in examples, one or more of the components 302-306 (and/or 308) may be implemented as one or more hardware logic components, such as one or more application specific integrated circuits (ASIC), field-programmable gate arrays (FPGAs), program-specific standard products (ASSPs), complex programmable logic devices (CPLDs), and/or the like. For ease of discussion, the components 302-308 are illustrated as separate components. However, one or more of the components 302-308 may be implemented as any number of components to implement the functionality discussed herein (e.g., combined or separated into additional components). The components 302-308 can be communicatively coupled to each other to other to provide signals/data/instructions and/or for other purposes.

The planner 302 can be configured to generate/determine target data 310 indicating one or more target/predetermined/desired states for the lawn mower 102. For example, the target data 310 can indicate one or more target positions, target orientations/headings, target linear velocities, target rotational/angular velocities, and so on. In some cases, one or more of a target position, target orientation, target linear velocity, or target rotational velocity can be referred to as a target trajectory. For example, a target trajectory can refer to multiple target positions and multiple orientations for the lawn mower 102 at the respective positions over time. As such, a target trajectory can define a target path for the lawn mower 102. Further, a position and orientation can be referred to as a pose.

The planner 302 can use various techniques to generate the target data 310. The planner 302 can generate the target data automatically (e.g., based on sensor data, control signals, etc.), based on user input (e.g., receiving input from a user via an interface), and so on. In some examples, the planner 302 can receive/determine a boundary/demarcation/node/point indicating a periphery of an area to be mowed/traversed. Such boundary can be provided by a user via an input device (e.g., a user interface on the lawn mower 102, a user interface on a separate device, etc.), a user logging positions while traversing an area, provided/determined automatically as an operator controls the lawn mower 102 (e.g., autonomously, semi-autonomously, or manually) having sensors that are able to determine the boundary, or otherwise. Here, the planner 302 can then generate target data/trajectory to cover the area indicated by the boundary. In other examples, the planner 302 can generate the target data 310 without having a boundary first defined. A position indicated in the target data 310 can include/be represented as a Global Navigation Satellite System (GNSS) location (e.g., Global Positioning System (GPS)), waypoint, cartesian coordinate, latitude and/or longitude position, and the like.

In some cases, the planner 302 can seek to generate target data that satisfies one or more criteria, such as minimizing/optimizing a length of travel over a defined region, minimizing energy consumption of the lawn mower 102, minimizing travel over already mowed sections, etc. In examples, the planner 302 can implement Bellman Ford's algorithm, Dijkstra's Algorithm, or otherwise. Moreover, in examples, the planner 302 uses a certain amount of computational resources/time to generate target data (e.g., more than a threshold amount of resources/time). In some non-limiting examples, target/trajectory data can be generated/determined as described in U.S. patent application Ser. No. 16/95,495, entitled "Autonomous Lawn Mower," filed on Aug. 5, 2020, and/or U.S. patent application Ser. No. 17/025,583, entitled "Coverage Planner," filed on Sep. 18, 2020, the entire contents of both are incorporated herein by reference.

The controller 306 can be configured to generate/determine one or more control signals 312 (often referred to as "the control signal 312," for ease of discussion) and/or provide the control signal 312 to the drive unit 308 to control movement of the lawn mower 102. The control signal 312 can indicate an amount of force/torque (e.g., one or more force/torque values), such as an amount of force/torque to apply to one or more wheels/movement members to move the lawn mower 102. To generate the control signal 312, the controller 306 can use the target data 310 received from the planner 302, state data 314 received from the state determination component 304, and/or other data/signals. The state data 314 can indicate a current state of the lawn mower 102. To illustrate, the controller 306 can generate the appropriate control signal to cause the drive unit 308 to move the lawn mower 102 from a current state (e.g., current position, orientation, velocity, etc.) indicated in the state data 314 to a target state (e.g., target position, orientation, velocity, etc.) indicated in the target data 310. In some examples where a control interface (e.g., the control interface 112) is implemented to control the lawn mower 102, signals received from the control interface 112 can be sent to the controller 306 to determine resultant control signals to apply/send to the drive unit 308. As such, the controller 306 can implement functionality in various autonomous, semi-autonomous, and/or manual modes to control the lawn mower 102.

In examples, the planner 302 can be configured to generate updated target data. In one illustration, the planner 302 can provide initial target data to the controller 306 and the controller 306 can provide the control signal 312 to the drive unit 308 to move the lawn mower 102 based on the target data 310. The planner 302 can periodically or continuously receive state data 314 indicating a current state of the lawn mower 102 and update the target data 310 when the current state of the lawn mower 102 is misaligned with the target data 310 by more than a threshold amount, such as the lawn mower 102 being positioned outside a threshold distance to a target position, the lawn mower 102 being oriented differently by more than a threshold amount to a target orientation, the lawn mower 102 having a current velocity that is less/more than a threshold amount from a target velocity, and so on. Although various functionality is discussed in the context of the planner 302, one or more other components can alternatively, or additionally, implement the functionality of the planner 302.

The state determination component 304 can be configured to determine/estimate at current state of the lawn mower 104 and/or generate the state data 314 indicating the current state of the lawn mower 102. The current state can include a current position, current orientation, current linear velocity, current rotational/angular velocity, and so on. The state determination component 304 can receive data from one or more sensors of the lawn mower 102, the control signal 312 from the controller 306, data from the drive unit 308 indicating a position of a wheel/movement member, data from a computing resource (e.g., the computing resource 104, not shown in FIG. 4) indicating a state of the lawn mower 102, etc., and use such data/signal to generate the state data 314. The state data 314 can be updated over time to indicate a current state of the lawn mower 102. The state determination component 304 can implement a variety of techniques to determine the current state of the lawn mower 102, such as a Kalman filter, dead reckoning, processing of sensor data, etc. In some cases, the current state of the lawn mower 102 is determined relative to a map, coordinate frame (e.g., world coordinate frame), a device/component, and/or another frame of reference.

In some examples, the state determination component 304 can include/implement a dynamic model and/or a kinematic model to estimate/simulate a current state of the lawn mower 102. For example, the dynamic model can be configured to receive the control signal 312 and generate, based on the control signal 312, first output data indicating an estimated velocity, estimated rotation rate, estimated linear acceleration, and/or estimated angular acceleration. Further, the kinematic model can be configured to receive the control signal 312 and/or the first output data and generate, based on the control signal 312 and/or the first output data, second output data indicating an estimated position and/or estimated orientation of the lawn mower 102 (e.g., an estimated pose when both are provided).

The drive unit 308 can include one or more motors/actuators to provide force/torque to one or more wheels, tracks, or other movement members configured to move the lawn mower 102. The drive unit 308 can receive the control signal 312 from the controller 306 and apply the amount of force/torque indicated in the control signal 312 to a movement member (e.g., wheels, etc.) or otherwise use the control signal 312 to apply the appropriate amount of force/torque to the movement member. As noted above, in the illustrated example, the lawn mower 102 includes two drive wheels that can be independently or cooperatively driven to move the lawn mower 102, which can include applying different amounts of torque to the wheels. However, any number of drive wheels or other wheels can be implemented.

In examples, the planner 302 uses a certain amount of resources/time to generate target data (e.g., more than a threshold amount of resources/time). In some cases, the controller 306 and/or state determination component 304 can perform processing to maintain the lawn mower 102 on a target trajectory, wherein such processing can be performed with less resources/time than that required by the planner 302 to generate target data. To illustrate, the planner 302 can consume a certain amount of resources/time to determine a target trajectory, whereas the controller 306 and/or state determination component 304 can perform processing multiple times to adjust movement of the lawn mower 102 relative to the target trajectory in a manner that consumes less resources/time.

Figure 4:
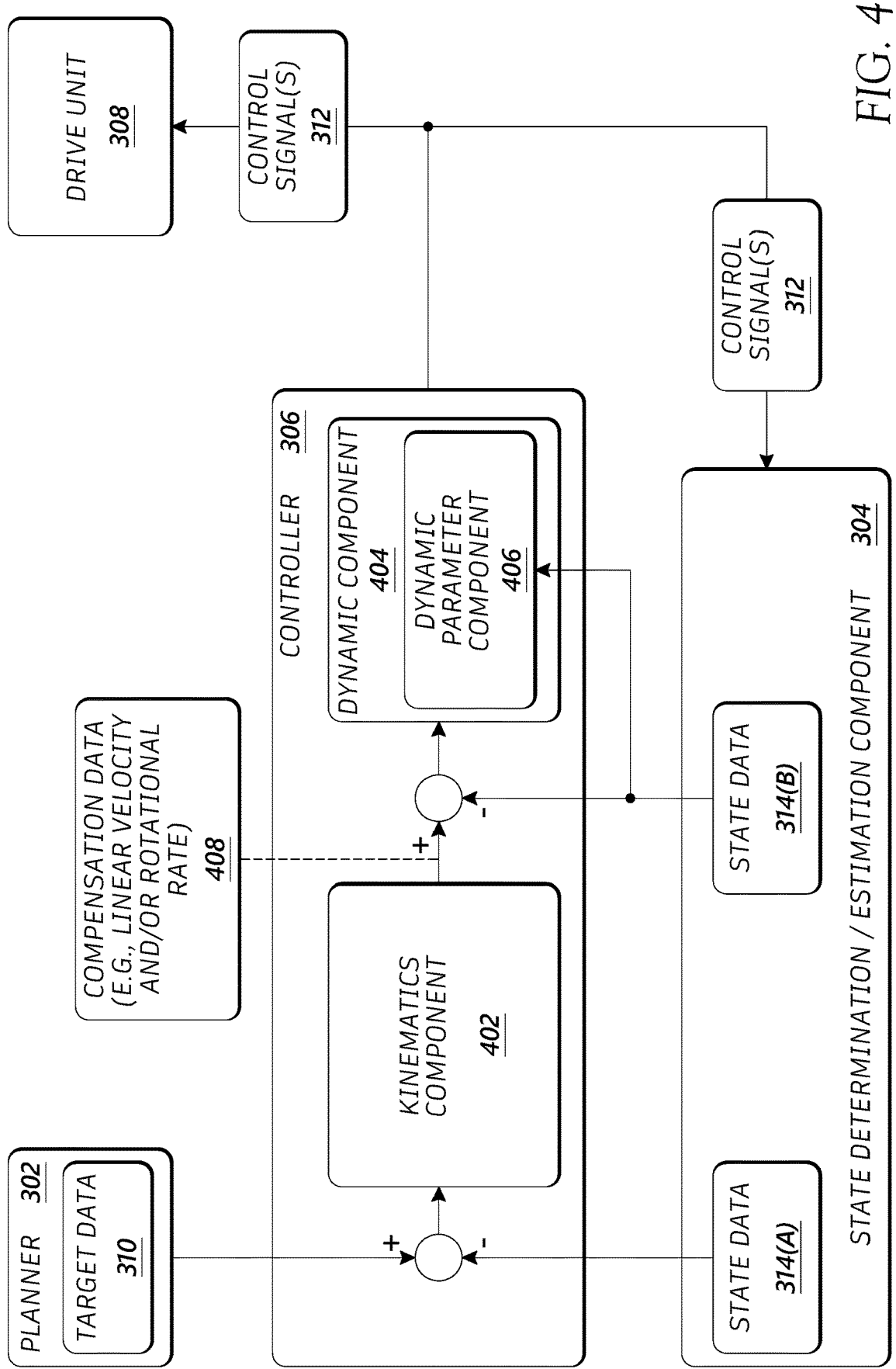
FIG. 4 illustrates example details of the controller of FIG. 3 according to one or more examples.

FIG. 4 illustrates example details of the controller 306 according to one or more examples. As shown, the controller 306 can include a kinematics component 402 and a dynamic component 404, wherein the dynamic component 404 can include a dynamic parameter component 406. As similarly discussed above for various components, one or more of the components 402-406 can include executable instructions that, when executed by processing/control circuitry, cause the processing circuitry to perform various operations discussed herein. For example, one or more of the components 402-406 can include software/firmware modules. Further, in examples, one or more of the components 402-406 may be implemented as one or more hardware logic components, such as one or more application specific integrated circuits (ASIC), field-programmable gate arrays (FPGAs), program-specific standard products (ASSPs), complex programmable logic devices (CPLDs), and/or the like. For ease of discussion, the components 402-406 are illustrated as separate components. However, one or more of the components 402-406 may be implemented as any number of components to implement the functionality discussed herein (e.g., combined or separated into additional components). The components 402-406 can be communicatively coupled to each other to other to provide signals/data/instructions and/or for other purposes.

The kinematics component 402 can be configured to receive the target data 310 from the planner 302, receive the state data 314 from the state determination component 304, and/or use such data to determine that a current state of the lawn mower 102 is different than a target state. In the example shown, a difference can be calculated/determined between the target data 310 and the state data 314 (e.g., a difference between a target state and a current state of the lawn mower 102). This difference (also referred to as "a difference signal") can be input into the kinematics component 402 in addition, or alternatively, to the target data 310 and/or the state data 314 (e.g., in an unchanged form).

In some cases, the target data 310 and/or state data 314 is represented with one or more parameters, such as a linear velocity parameter (sometimes represented with a "v") indicating a target/current linear velocity, a rotational velocity parameter (sometimes represented with a "w") indicating a target/current rotational velocity/rate, a position parameter indicating a target/current position (sometimes represented with x, y, and/or z coordinates), an orientation parameter (sometimes represented with a "Ø") indicating a target/current orientation, and so on. In such cases, the difference signal that is provided to the kinematics component 402 can include a difference between the respective parameters (e.g., a difference signal for each of the parameters).

The kinematics component 402 can use the difference signal, the target data 310, and/or the state data 314 to generate/determine compensation data 408 indicating a compensation speed/linear velocity (sometimes represented as "$v_d$") and/or a compensation rotational rate (sometimes represented as "$\omega_d$"). The compensation speed and/or compensation rotational rate can be calculated based on an amount of error/difference between a target state and current state.

In some non-limiting examples, the difference signal (also referred to as error "e") that is input into the kinematics component 402 and/or the compensation data 408 that is output by the kinematics component 402 can be calculated/determined according to one or more of the following equations. Here, variables/parameters with subscript r can refer to reference/target variables/parameters, variables/parameters with subscript s can refer to current state variables/parameters, and variables/parameters with subscript d can refer to compensation variables/parameters.

For illustrative purposes, a two-dimensional error state can be initially defined as:

$$e = [x_r - x_s, \ y_r - y_s, \ \phi_r - \phi_s]^T, \tag{1}$$

with $\dot{\phi}_s = \omega_s$, though any higher number of dimensions are contemplated.

The error state above can be transformed from an inertial frame to the lawn mower's frame by:

$$e_r = \begin{bmatrix} x_e \\ y_e \\ \phi_e \end{bmatrix} = \begin{bmatrix} \cos\phi_s & \sin\phi_s & 0 \\ -\sin\phi_s & \cos\phi_s & 0 \\ 0 & 0 & 1 \end{bmatrix} e, \tag{2}$$

Differentiating the error dynamics of the equation (2) above, an error rate can be defined as:

$$\dot{e}_r = \begin{bmatrix} \dot{x}_e \\ \dot{y}_e \\ \dot{\phi}_e \end{bmatrix} = \begin{bmatrix} \omega_d y_e - v_d + v_r \cos\phi_e \\ -\omega_d + v_r \sin\phi_e \\ \omega_r - \omega_d \end{bmatrix}, \tag{3}$$

According to various techniques/algorithms the following controls can be written as:

$$v_d = v_r \cos\phi_e + k_x x_e, \tag{4}$$

$$\omega_d = \omega_r + v_r(k_x y_e + k_\phi \sin \phi_e), \quad (5)$$

where variables $k_x$, $k_y$, $k_\phi$ are gains used to emphasize which error in vector of equation (1) can be minimized faster. In examples, the kinematics component 402 outputs just two outputs/variables, such as linear velocity ($v_d$) and angular velocity ($\omega_d$). However, in other examples, any number of variables/outputs can be provided.

In some examples, the controller 306/kinematics component 402 can implement an algorithm that is stable using the Lyapunov function. For example, using the Lyapunov function it can be shown that the controller 306 is asymptotically stable (e.g., for $e_r = 0$ and $\dot{V} < 0$ as long as $v_r > 0$).

The dynamic component 404 can be configured to receive the compensation data 408 from the kinematics component 402 and/or receive the state data 314 from the state determination component 304 and/or use such data to determine the control signal 312 for controlling movement of the lawn mower 102. In the example shown, a difference can be calculated/determined between the compensation data 408 (e.g., a compensation speed ("$v_d$") and/or a compensation rotational rate ("$\omega_d$")) and the state data 314 (e.g., the current linear speed and/or current rotational rate). This difference (also referred to as "a difference signal") can be input into the dynamic component 404 in addition, or alternatively, to the compensation data 408 and/or the state data 314 (e.g., in an unchanged form).

To generate the control signal 312, the dynamic component 404 can determine an amount of force/torque for the drive unit 308 to maintain/return the lawn mower 102 to a target state. In examples where the drive unit 308 includes or is associated with multiple wheels/movement members, the dynamic component 404 can determine an amount of force/torque to apply to each wheel/movement member. Here, the control signal 312 can indicate an amount of force/torque for each of the wheels/movement members (e.g., multiple force/torque values). To illustrate, the lawn mower 102 can include left and right drive wheels and the control signal 312 can indicate an amount of torque to apply to each of the wheels, which can be different.

In some cases, different state data is provided to the kinematics component 402 and the dynamic component 404. For example, the state data 314(A) illustrated in FIG. 4 that is provided to the kinematics component 402 (and/or used to determine a difference signal) can be different than the state data 314(B) that is provided to the dynamic component 404 (and/or used to determine a difference signal). To illustrate, the state data 314(A) can indicate a current pose, a current linear velocity, and a current rotational velocity of the lawn mower 102. Whereas the state data 314(B) can indicate a current linear velocity and a current rotational velocity/rate of the lawn mower 102. However, the state data 314(A)/314(B) can be the same and/or indicate other types of information/parameters.

In the example shown, the dynamic component 404 includes the dynamic parameter component 406 that is configured to calculate/determine one or more dynamic parameters/values that are used in determining an amount of torque/force for the control signal 312. For example, a dynamic parameter can relate to a mass associated with the lawn mower 102 (e.g., the mass of the lawn mower 102 with or without an operator) and/or inertia of the lawn mower 102. A dynamic parameter may generally be calculated/determined while the lawn mower 102 is operating, since the dynamic parameter can change due to various conditions, such as environmental conditions (e.g., incline, decline, etc.), a weight of a user operating the lawn mower 102, etc.

In some cases, a dynamic parameter is as a composite parameter that is calculated based on multiple variables. Example dynamic parameters include: a mass/weight of the lawn mower 102, a mass/weight of an operator, a mass/weight of a wheel or another component of the lawn mower 102, a combined mass/weight of the lawn mower 102, operator, and/or wheel, inertia of lawn mower 102 about an axis, wheel inertia about its diameter, wheel inertia about its turning axis, one or more combinations of the parameters, an additional parameter defined based on one or more of the above-noted parameters, etc.

In some non-limiting examples, the dynamic parameter component 406 implements one or more of the following equations to calculate/determine a dynamic parameter. Here, variables/parameters with subscript s can refer to current state variables/parameters, and/or variables/parameters with subscript d can refer to variables/parameters passed from the kinematics component 402 (e.g., desired variables).

Dynamics of a lawn mower can be designed as:

$$\dot{q}_s = \mathcal{A}(q_s)a + \mathcal{B}\tau, \quad (6)$$

A state vector can be written as:

$$q_s = [v_s \ \omega_s]^T, \quad (7)$$

and $$\mathcal{A}(q_s) = \begin{bmatrix} 0 & \omega_s^2 \\ -v_s \omega_s & 0 \end{bmatrix}, \quad (8)$$

where v represents forward velocity of the CoM in m/s, $\omega$ is rotational velocity of Center of Mass (COM) around positive z axis in radians, x and y are positions of COM on plane in meters and $\theta$ is heading angle (+x having zero heading angle).

The vector of input torques can be:

$$\tau = [\tau_r \ \tau_l]^T, \quad (9)$$

where $\tau_r$ and $\tau_l$ are torques (in newton meters) applied to right and left motors/wheels accordingly.

Parameters of the model $a_i$ are split in a and $\mathcal{B}$:

$$a = [a_1 \ a_4]^T, \quad (10)$$

$$\mathcal{B} = \begin{bmatrix} a_2 & a_3 \\ a_5 & -a_6 \end{bmatrix}, \quad (11)$$

Parameters in equations (10) and (11) can be composite parameters according to following equations:

$$\begin{aligned}
a_1 &= \frac{m_c d}{p_1}, \\
a_2 = a_3 &= \frac{1}{p_1 r}, \\
a_4 &= \frac{-m_c d}{p_2}, \\
a_5 = a_6 &= \frac{l}{p_2 r}, \\
p_1 &= m + \frac{2I_\omega}{r^2}, \\
p_2 &= I + \frac{2l^2 I_\omega}{r^2}, \\
m &= m_c + 2m_w,
\end{aligned} \quad (12)$$

-continued $$I = I_c + m_c d^2 + 2m_w l^2 + 2I_m,$$

with variables defined as:
$m_c$: mass of chassis
$m_w$: mass of one wheel
$I_c$: chassis inertia round z-axis
$I_m$: wheel inertia about its diameter
$I_w$: wheel inertia about its turning axis
r: wheel effective radius
l: half the distance between two wheels
d: distance between COM and wheel axis In examples, the controller 306/dynamic component 404 is configured to exponentially converge a current state of the lawn mower 102 to a target state, such as to converge the current state to a target trajectory. Further, in examples, the controller 306/dynamic component 404 can implement an algorithm that is stable using contraction analysis.

In some non-limiting examples, the dynamic component 404 implements one or more of the following equations to generate a control signal, which can use one or more of the parameters/values calculated by the dynamic parameter component 406. In some instances, contraction analysis can be used to show the stability of the controller 306/dynamic component 404.

For examples, with dynamics, the partial contraction theory can be used to show stability of the controller 306. Dynamics of a virtual closed-loop system can be written as:

$$\dot{q} = \mathcal{A}(q)a + \mathcal{K}(q_s)(q_s - q), \quad (13)$$

By assigning $q = q_s$, then dynamics of the system in equation (6) can be a solution of a virtual system. Similarly, it can be shown that a desired trajectory which respects dynamics of a closed loop system can be written as:

$$\dot{q}_d = \mathcal{A}(q_d)a + \mathcal{K}(q_s)(q_s - q_d), \quad (14)$$

where $q_d$ is the vector of desired states, $$q_d = [v_d \, \omega_d]^T, \quad (15)$$

As both the system trajectories and desired trajectories can be solutions of virtual dynamics, it can be shown that all trajectories of the system converge to desired trajectories by showing that a virtual system's dynamics are contracting.

$$\frac{\partial \dot{q}}{\partial q} = -\mathcal{K}(q_s) \quad (16)$$

Which can be negative-definite as long as the gain matrix $\mathcal{K}(q_s)$ is positive definite. $\mathcal{A}(q_s)$ can be chosen to be:

$$\mathcal{K}(q_s) = \begin{bmatrix} k_v & 0 \\ 0 & k_\omega \end{bmatrix}, \quad (17)$$

where $k_v$ and $k_\omega$ are positive scalar gains.

As the virtual system is contracting, then control inputs/signals t can be written as:

$$\mathcal{B}(q_s)\tau = \dot{q}_d - \mathcal{A}(q_s)a - \mathcal{K}(q_s)(q_s - q_d), \quad (18)$$

$$\tau = \mathcal{B}(q_s)^{-1}[\dot{q}_d - \mathcal{A}(q_s)a - \mathcal{K}(q_s)(q_s - q_d)], \quad (19)$$

where $$\dot{q}_d = [\dot{v}_d \, \dot{\omega}_d]^T, \quad (20)$$

To estimate the parameters, an estimate variable â can be defined and used in place of a in equations (16)-(21). The virtual system can still be contracting as long as dynamics of â are contracting. Dynamics of â can be written as:

$$\dot{\hat{a}} = \mathcal{P} \mathcal{A}(q_s) T(q_s - q_d), \quad (21)$$

where $\mathcal{P}$ is diagonal vector of adaptation gains with positive scalar values.

$$\mathcal{K}(q_s) = \begin{bmatrix} p_v & 0 \\ 0 & p_\omega \end{bmatrix}, \quad (22)$$

In the example of FIG. 4, the controller 306 is configured to implement one or more loops, wherein output data is feedback into the system. For example, the control signal 312 can be provided back to the state determination component 304 to determine updated state data 314, which can be provided back to the kinematics component 402 and/or the dynamic component 404.

Figure 5:
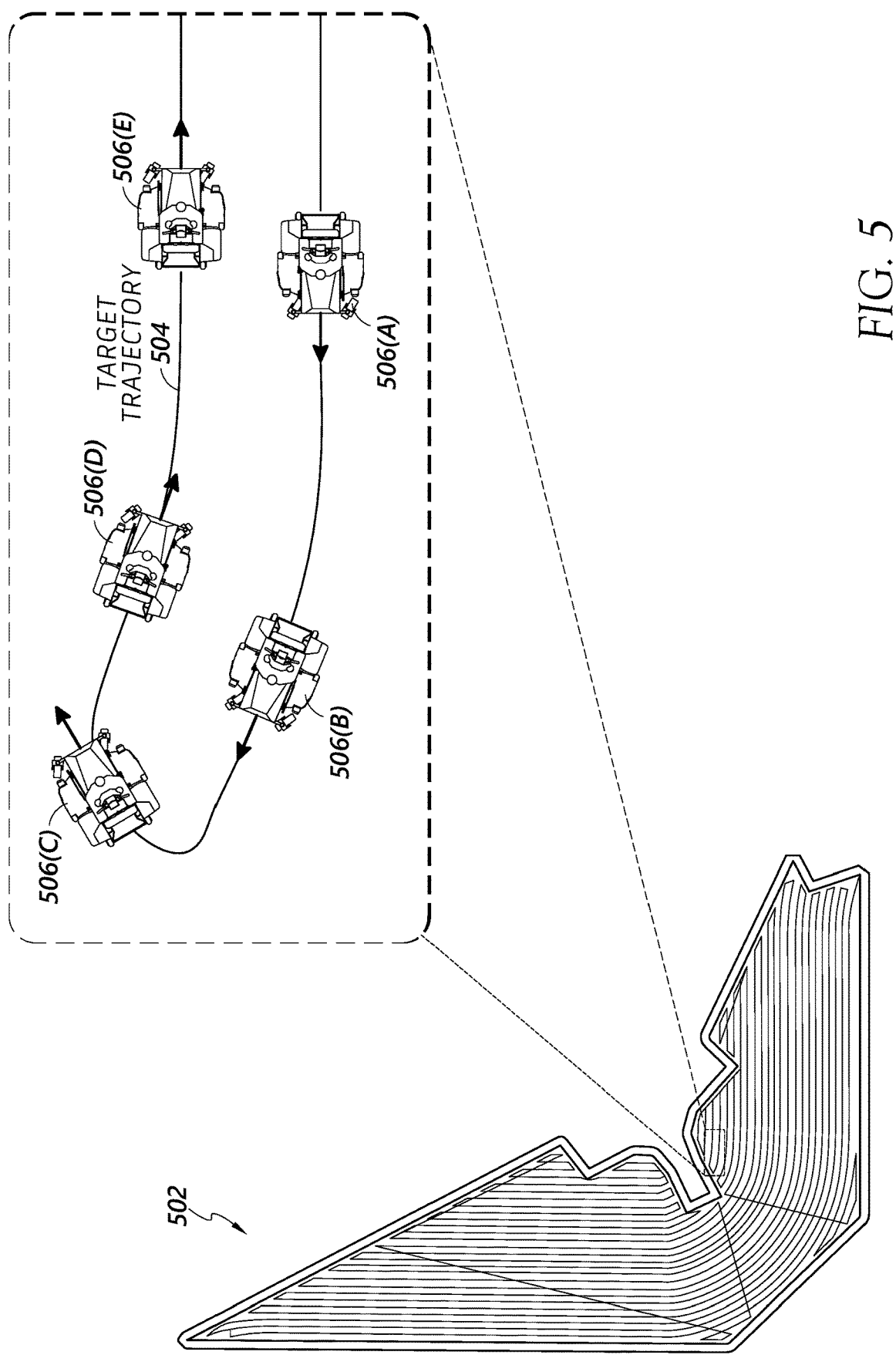
FIG. 5 illustrates a representation of example target data that can be implemented with one or more of the techniques and architectures discussed herein.

FIG. 5 illustrates a representation of example target data that can be implemented with one or more of techniques and architectures discussed herein. In particular, this figure shows an example coverage plan 502 for a lawn mower to traverse to move an area. The coverage plan 502 includes one or more target trajectories (including a target trajectory 504) indicating a target/desired path (e.g., set of positions) for the lawn mower to follow and/or an target orientation of the lawn mower along the target path. Poses 506(A)-506(E) represent some of many target poses along the target trajectory 504. For ease of illustration, five target poses 506 are shown; however, any number of target poses can be implemented. A target trajectory can also indicate or be associated with a target velocity for the lawn mower. For example, each of the target poses 506 can be associated with a target linear velocity and/or target rotational velocity (e.g., a velocity at which the lawn mower should be moving at the respective position).

Figure 6:
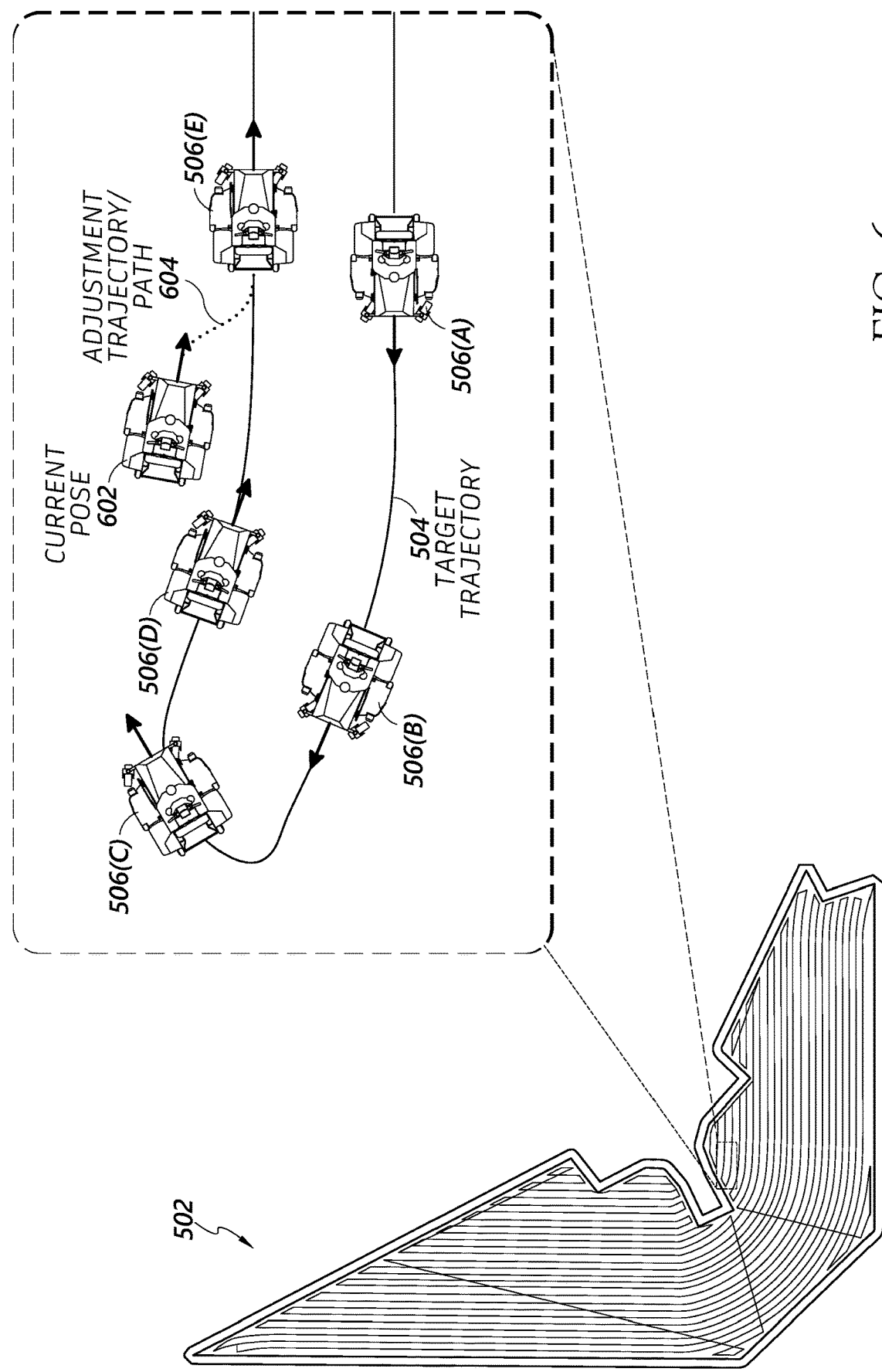
FIG. 6 illustrates a current pose of a lawn mower and an adjustment trajectory with respect to the target trajectory from FIG. 5.

FIG. 6 illustrates a current pose 602 of a lawn mower with respect to the target trajectory 504 from FIG. 5. As shown, the lawn mower has deviated from the target trajectory 504 to a position associated with the current pose 602. By implementing the techniques discussed herein, the lawn mower can determine an adjustment trajectory/path 604 to return the lawn mower to the target trajectory 504. For example, the lawn mower can generate one or more control signals to cause the lawn mower to move in a manner that returns the lawn mower to the target trajectory 504. Here, the lawn mower returns to the target trajectory 504 at the target pose 506(E). In examples, the techniques can independently apply more/less torque to the wheels of the lawn mower to steer/adjust a speed of the lawn mower to reach a target state of the lawn mower.

Figure 7:
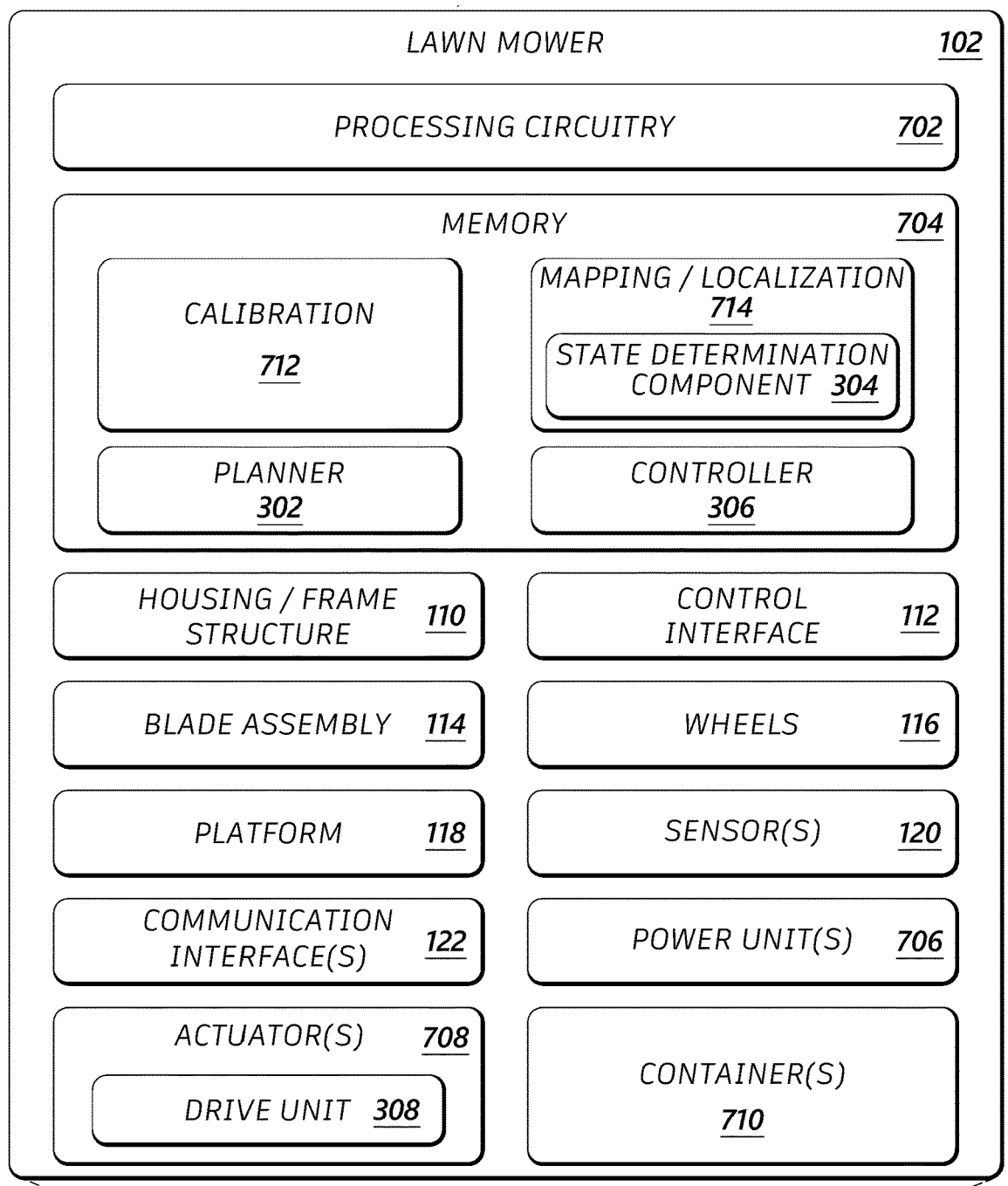
FIG. 7 illustrates additional details of the lawn mower of FIG. 1 that can be implemented in one or more examples.

FIG. 7 illustrates additional details of the lawn mower 102 that can be implemented in some examples. As shown, the lawn mower 102 can include processing/control circuitry 702, memory 704, the housing/frame structure 110, the control interface 112, the blade assembly 114, the wheels 116, the platform 118, the one or more sensors 120, the one or more communication devices/interfaces 122, one or more power units 706, one or more actuators 708, and/or one or more containers 710. For ease of discussion and illustration, the processing/control circuitry 702 and memory 704 are shown as separate blocks from the other components of the lawn mower 102. However, the processing circuitry 702 and/or memory 704 can be integrated into any of the components of the lawn mower 102 and/or the various components of the lawn mower 102 can include separate instances of the processing circuitry 702 and/or memory 704. For example, the control interface 112 can include its own processing circuitry and/or data storage/memory.

Although the processing circuitry 702 is illustrated as a separate component from the memory 704 and communication interface(s) 122, it should be understood that the memory 704 and/or communication interface(s) 122 can be embodied at least in part in the processing circuitry 702. For instance, the processing circuitry 702 can include various devices (active and/or passive), semiconductor materials and/or areas, layers, regions, and/or portions thereof, conductors, leads, vias, connections, and/or the like, wherein one or more of the memory 704 and the communication interface(s) 122 and/or portion(s) thereof can be formed and/or embodied at least in part in/by such circuitry components/devices.

The processing circuitry 702, memory 704, control interface 112, sensor(s) 120, communication interface(s) 122, power unit(s) 706, and/or actuators 708, and/or other components of the lawn mower 102 can be electrically and/or communicatively coupled using certain connectivity circuitry/devices/features, which can or may not be part of processing circuitry 702. For example, the connectivity feature(s) can include one or more printed circuit boards configured to facilitate mounting and/or interconnectivity of at least some of the various components/circuitry. In some examples, two or more of the components may be electrically and/or communicatively coupled to each other.

The memory 704 may store a calibration component/subsystem 712, mapping/localization component/subsystem 714 (which can include the state determination component 304), planner component/subsystem 302, and controller component/subsystem 306. In examples, one or more of the components 712, 714, and 302-306 can include executable instructions that, when executed by the processing circuitry 702, cause the processing circuitry 702 to perform various operations discussed herein. For example, one or more of the components 712, 714, and 302-306 can include software/firmware. Further, in examples, one or more of the components 712, 714, and 302-306 may be implemented as one or more hardware logic components, such as one or more application specific integrated circuits (ASIC), field-programmable gate arrays (FPGAs), program-specific standard products (ASSPs), complex programmable logic devices (CPLDs), and/or the like. For example, the controller 306 can be implemented as a separate hardware device outside of the memory 704. For ease of discussion, the components 712, 714, and 302-306 are illustrated as separate components. However, one or more of the components 712, 714, and 302-306 may be implemented as any number of components to implement the functionality discussed herein (e.g., combined or separated into additional components).

The calibration component 712 may perform calibration of the one or more sensor(s) 120 and/or actuators 708. Calibration may comprise determining one or more sensor intrinsics and/or extrinsics, as well as determining positions of components or subcomponents (e.g., blade height), applied torques relative to currents applied, and the like. Such calibration protocols performed by calibration component 712 may ensure that any one or more components or subcomponents/components of the lawn mower 102 are working properly and/or enable correct calculations to be generated given the lawn mower's 102 current understanding of the relative positions, orientations, and/or parameters of the other components and subcomponents.

The mapping/localization component 714 can receive sensor data from any one or more of the sensor(s) 120, in addition to any one or more outputs from the calibration component 712 to map an area and/or provide a position and/or orientation of the lawn mower 102 relative to the map. As shown, the mapping/localization component 714 can include the state determination component 304 configured to determine/estimate a current state of the lawn mower 102 (which can include implementing localization techniques) and/or maintain a history of previous states of the lawn mower 102, as discussed herein. In examples, sensor data from the one or more sensor(s) 120 can be used to construct (and/or update) a two- and/or three-dimensional map of a scanned area. When updating, preexisting map data may be received from the memory 704 and/or from the computing resource(s) 104. Multiple mapping techniques may be used to construct a two- or three-dimensional map based on the acquired sensor data including, but not limited to SLAM, Kalman filters (Unscented Kalman Filters, Extended Kalman Filters, etc.), occupancy grids, bundle adjustment, sliding window filters, and the like. Such a map can be stored as a signed distance function (SDF), or truncated SDF (TSDF), triangle mesh, mosaics, etc. Use of voxel hashing can improve memory requirements for both storage and raycasting. In at least some examples, sensor data can include radar data indicative of objects/subterranean objects (e.g., pipes, golf balls, rocks, etc.). Such subterranean objects can provide features for use in creating the map. For example, locations of sprinklers, piping, rocks, moisture levels, and the like may be combined (or fused) with other sensor data to both generate the maps and localize against them.

Furthermore, various combinations of sensor data can be used to provide additional insight as derived sensor data. As a non-limiting example, sensor data from wide-angle, dual baseline, image sensors can be used to reconstruct depth of the environment and/or provide additional features for use in generating the map and/or localizing the lawn mower 102 against such a map. Any such derived sensor data may be either used for mapping and/or localization, as well as may be associated with the map after it has been generated (e.g., storing the value associated with the portion of the map where the data was collected). Further, in at least some examples, control signals (as may be received and/or generated by the lawn mower 102) can be associated with the map by the mapping/localization component 714. In some examples, satellite-based navigation data (e.g., GNSS data) can be used to inform a Region of Interest (ROI) of satellite imagery to download to, or otherwise augment, a two- or three-dimensional map. Additionally, or alternatively, the lawn mower 102 can download, or otherwise access, weather data as additional sensor data. The weather data can be indicative of, for example, weather conditions for the time of day associated with the other sensor data.

A map can include signed distance functions (SDFs) or truncated signed distance functions TSDFs, mesh representations, UTM grids, mosaics, tiles, etc., including any topological relationship between such sensor data. In some examples, voxel hashing may be used to minimize memory requirements for both map storage and retrieval. Such a map may also be associated with additional sensor data (and/or data derived from the additional sensor data, such as segmentations, classifications, output from machine learning algorithms, etc.). For example, moisture level data, soil density data, vegetative health indicators (e.g., growth, absence of growth, presence of pests, presence of weeds or invasive species, etc.), thermal data, ambient light data, etc.

can be associated with one or more locations in a map. Additionally, or alternatively, image sensor data (e.g., color) can be associated with a map as well (e.g., by weighted averaging, or the like), so that a user viewing the map can quickly see a virtual representation of the scanned area, including color.

In addition to, or alternatively from, the functionality discussed elsewhere herein, the controller 306 (and/or the planner 302, in some cases) can determine/generate commands/control signals for operating one or more of the actuator(s) 708, which can include the drive unit 308 and/or other elements.

In some examples in which the lawn mower 102 is operated manually (e.g., by being pulled, pushed, attached to a mower, controlled via the control interface 112, etc.), the planner 302 can calculate/determine an optimal control pattern for a user to take. As a non-limiting example, such a trajectory can comprise the shortest pattern needed to sweep/traverse an area (region) provided and/or otherwise determine control signals for actuation based on input received from a user in order to perform a particular task. In some examples, an optimal control pattern/optimal path and/or an indication of optimal controls can be displayed on a display.

The one or more power units 706 can be configured to manage and/or provide power for one or more components of the lawn mower 102. In some examples, the one or more power units 706 include one or more batteries, such as a lithium-based battery, a lead-acid battery, an alkaline battery, and/or another type of battery. The one or more power units 706 can comprise one or more devices and/or circuitry configured to provide a source of power and/or provide power management functionality. Further, the power unit(s) 706 can include a capacitor(s), in some cases. Moreover, in some examples the one or more power units 706 include a fuel-based engine, such as an internal combustion engine, and/or a fuel tank to store a fuel source. In some instances, a first set of components are operated from a first power source (e.g., fuel-based engine), while a second set of components are operated from a second power source (e.g., batteries).

The one or more actuators 708 can include the drive unit 308 to provide torque to the one or more wheels 116/114(3), a linear actuator to raise and/or lower the blade assembly 114, a motor to spin a blade for cutting, one or more brakes associated with the one or more wheels 116/114(3), and the like. The drive unit 308 can include/control one or more motors to drive the one or more wheels 116/114(3). The one or more actuators 708 may further comprise, for example, electric and/or mechanical motors, hydraulics, pneumatics, and the like. Upon receiving a signal from one or more the processing circuitry 702 and a component stored in the memory 704, an actuator(s) may actuate to effectuate a trajectory (e.g., steering, acceleration, speed, etc.), release a substance (e.g., fertilizer, seed, herbicide, pesticide, insecticide, seed, etc.), raise/lower the blade assembly 114, raise/lower or otherwise adjust the platform 118, and so on. The one or more containers 710 can be configured to hold grass/yard clippings and/or a substance(s) (e.g., fertilizer, seed, herbicide, pesticide, insecticide, seed, etc.), which can be released in an environment using an actuator.

The lawn mower 102 can also include one or more I/O devices, including one or more displays, buttons, microphones, speakers, microphones, keyboards, joysticks, mice, touch pads, wearable devices (e.g., optical head-mounted display), and so on. The one or more I/O devices can be configured to receive touch, speech, gesture, or any other type of input. The one or more displays can include a liquid-crystal display (LCD), a light-emitting diode (LED) display, an organic LED display, a plasma display, an electronic paper display, or any other type of technology. In some examples, the one or more displays include one or more touchscreens. In examples, the one or more I/O devices are implemented as part of the control interface 112.

In some examples, the lawn mower 102 can alter user provided input to ensure consistent mowing and/or safe operation of the autonomous lawn mower. As non-limiting examples, control signals can be determined based on user input to cause the lawn mower 102 to move along straight lines, to perform smooth transitions between blade speeds and/or heights, to ensure consistent and uniform turns, to limit proximity to obstacles, to follow/track an object (such as a curb or fence line—either detected in sensor data, determined from map data associated with a map of the area, or the like), to ensure that the lawn mower 102 stays within a predefined boundary, and the like. In at least some examples where a pattern is available to the lawn mower 102 when the control interface 112 is engaged, the lawn mower 102 may ensure that positional deviations from the pattern are minimized (e.g., by limiting a control input proportionally to a Euclidian distance to a nearest point along the pattern), while relaxing any one or more other constraints. To illustrate, a user may be able to control the lawn mower 102 at speeds faster or slower, at blade heights higher or lower, at blade speeds faster or slower, etc., than those associated with the pattern, so long as the lawn mower 102 proceeds along the pattern. In those examples in which an object is tracked or followed, sensor data from the one or more sensors associated with the lawn mower 102 may be used to ensure the lawn mower 102 does not run into the object and/or off the curb, while in the cases of fences and/or curbs, a consistent distance is maintained to the tracked object.

In some examples, the lawn mower 102 can compensate for various conditions, such as environmental conditions and/or conditions of the components of the lawn mower 102. Such compensation can occur when the lawn mower 102 is operating in a manual mode and/or autonomous mode. In one example, the processing circuitry 702 can determine that one or more drive wheels have lost traction on a surface. If one of the drive wheels has lost traction, the processing circuitry 702 can adjust the other drive wheel (e.g., reducing the speed of the other wheel) such that the lawn mower 102 can maintain the appropriate path (without being undesirably pulled to one side). In another example, the processing circuitry 702 can update a speed of a drive wheel when there is a difference between a speed of a first drive wheel and a speed of a second drive wheel and the same torque values are applied to drive the first and second wheels. Here, the difference in speed can be due to the functioning of a component, such as a motor, gearbox, or other actuator/sensor/etc., which may be due to manufacturing tolerances or otherwise. A speed of a wheel can be determined from a sensor at the wheel. To address the difference, the processing circuitry 702 can cause a speed of one of the drive wheels to be increased (e.g., for the slower wheel) and/or a speed of the other drive wheel to be decreased (e.g., for the faster wheel). In yet another example, the processing circuitry 702 can update a speed of a drive wheel when there is a difference in tire pressure between one or more wheels, which can cause the lawn mower 102 to pull to one side. Here, the processing circuitry 702 can receive tire pressure data from one or more wheels, which can include drive wheels and/or non-drive wheels. To address the difference, the processing circuitry 702 can adjust a speed of one or more of the drive wheels.

In a further example of compensating for a condition, the processing circuitry 702 can update a speed of a drive wheel when the lawn mower 102 is traveling on an incline/decline, such as traveling up/down a hill, across a hill, etc. This can allow the lawn mower 102 to maintain the appropriate speed and/or trajectory/path in instances where the lawn mower 102 might otherwise be undesirably pulled down the hill. For instance, if the lawn mower 102 is transitioning from a flat section to a hill, the processing circuitry 702 can determine the appropriate torque adjustment to apply to the drive wheels to maintain the same speed, which can be based on an amount of torque previously applied to climb the hill (when the hill has been traversed previously), map data indicating elevation, motor feedback, forward progression, kinematic and/or dynamic models of the lawn mower 102, and the like. In examples, torque may be applied to one side (or wheel) to compensate for various orientations of the lawn mower 102 while advancing up the hill. Further, any other parameter which controls an aspect of the lawn mower 102 can be adjusted (e.g., blade speed, blade height, etc.) to compensate for various conditions/events.

Figure 8:
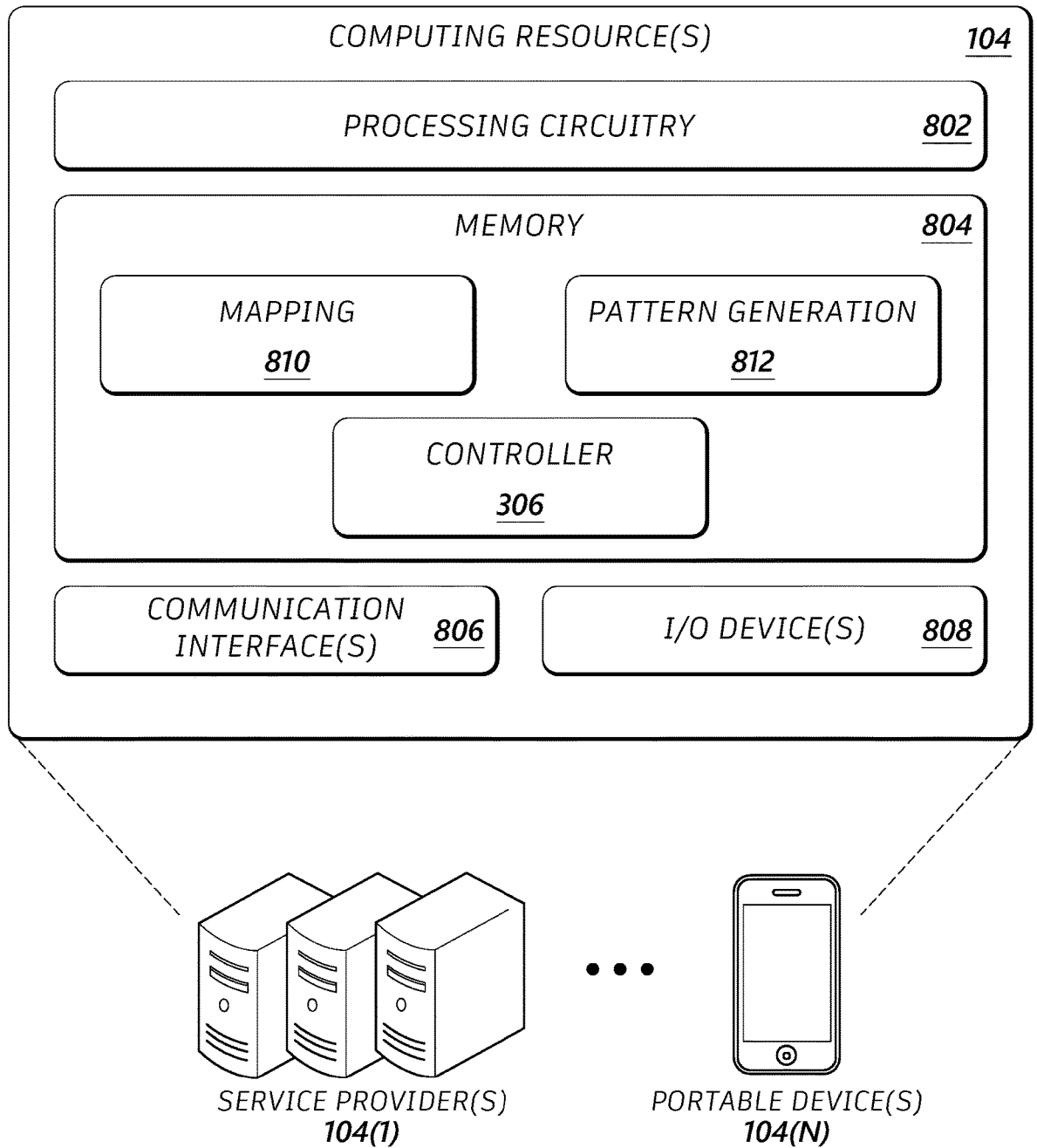
FIG. 8 illustrates details of the computing resource(s) of FIG. 1 that can be implemented in one or more examples.

FIG. 8 illustrates details of the computing resource(s) 104 that can be implemented in some examples. As shown, the computing resource(s) 104 can include processing/control circuitry 802, memory 804, one or more communication devices/interfaces 806, and/or one or more I/O devices 808. For ease of discussion and illustration, the processing/control circuitry 802 and memory 804 are shown as separate blocks from the other components. However, it should be understood that the processing circuitry 802 and/or memory 804 can be integrated into any of the components of the computing resource(s) 104 and/or the various components of the computing resource(s) 104 can include separate instances of the processing circuitry 802 and/or memory 804.

The processing circuitry 802, memory 804, one or more communication devices/interfaces 806, and/or one or more I/O devices 808 can be electrically and/or communicatively coupled using certain connectivity circuitry/devices/features, which can or may not be part of processing circuitry 802. For example, the connectivity feature(s) can include one or more printed circuit boards configured to facilitate mounting and/or interconnectivity of at least some of the various components/circuitry. In examples, two or more of the components may be electrically and/or communicatively coupled to each other.

The memory 804 can store a mapping component 810, a pattern generation component 812, and/or the controller 306. In examples, one or more of the components 810-812 and 306 include executable instructions that, when executed by the processing circuitry 802, cause the processing circuitry 802 to perform various operations discussed herein. For example, one or more of the components 810-812 and 306 can include software/firmware modules. Further, in examples, one or more of the components 810-812 and 306 may be implemented as one or more hardware logic components, such as one or more application specific integrated circuits (ASIC), field-programmable gate arrays (FPGAs), program-specific standard products (ASSPs), complex programmable logic devices (CPLDs), and/or the like. For ease of discussion, the components 810-812 and 306 are illustrated as separate components. However, one or more of the components 810-812 and 306 may be implemented as any number of components to implement the functionality discussed herein (e.g., combined or separated into additional components).

The mapping component 810 can receive sensor data (and/or data derived therefrom) from the one or more sensor(s) 120 and/or other components of the lawn mower 102 (e.g., via communication interface(s) 806) and use such data to generate a map of an area. The mapping component 810 can perform functionality similar to, or the same as, that described above in reference to the mapping/localization component 714. For example, such processing can be performed remotely by the mapping component 810, instead of being performed locally by the lawn mower 102. Further, in examples, one or more of such processing can be distributed amongst the mapping/localization component 714 and the mapping component 810.

The pattern generation component 812 can determine an optimal path and/or waypoints for the lawn mower 102 to follow to perform a given task such as, but not limited to, a path to follow when mowing an indicated area.

In examples, the computing resource(s) 104 can receive any other form of data (e.g., user authentication, obstacle detections, and the like) and process the data and make it available to any other user. As several non-limiting examples, the computing resource(s) 104 can compute statistics about a user operating the lawn mower 102 (such as amount of time mowed, an area mowed, and the like) and make that available to an end user (e.g., via a web interface). Similarly, additional data about obstacles received from the lawn mower 102 may be sent to an additional user to ensure that the obstacle is cleared for later autonomous mowing by the lawn mower 102.

In examples, the computing resource(s) 104 can be configured to perform any one or more of the functions discussed above in reference to components 712, 714, and/or 302-306, wherein the computing resource(s) 104 can be configured to communicate with the lawn mower 102 regarding such functions/processing. For example, the computing resource(s) 104 can include a remote instance of the controller 306 to operate independently and/or in cooperation with a controller instances 306 on the lawn mower 102 to perform one or more of the controller functions discussed herein.

The one or more I/O devices 808 can include one or more displays, buttons, microphones, speakers, microphones, keyboards, joysticks, mice, touch pads, wearable devices (e.g., optical head-mounted display), and so on. The one or more I/O devices 808 can be configured to receive touch, speech, gesture, or any other type of input. The one or more displays can include a liquid-crystal display (LCD), a light-emitting diode (LED) display, an organic LED display, a plasma display, an electronic paper display, or any other type of technology. In some examples, the one or more displays include one or more touchscreens.

The processing circuitry 702/802 may include one or more processors, processing circuitry, processing modules/units, chips, dies (e.g., semiconductor dies including come or more active and/or passive devices and/or connectivity circuitry), microprocessors, micro-controllers, digital signal processors (DSPs), microcomputers, central processing units (CPUs), graphics processing units (GPUs), field programmable gate arrays (FPGAs), programmable logic devices, state machines (e.g., hardware state machines), logic circuitry, analog circuitry, digital circuitry, application specific integrated circuits (ASICs), field-programmable gate arrays (FPGAs), program-specific standard products (ASSPs), complex programmable logic devices (CPLDs), and/or any device that manipulates signals (analog and/or digital) based on hard coding of the circuitry and/or operational instructions. Processing circuitry can further comprise one or more, storage devices, which can be embodied in a single memory device, a plurality of memory devices, and/or embedded circuitry of a device. Such data storage can comprise read-only memory, random access memory, volatile memory, non-volatile memory, static memory, dynamic memory, flash memory, cache memory, data storage registers, and/or any device that stores digital information. In examples in which processing circuitry comprises a hardware state machine (and/or implements a software state machine), analog circuitry, digital circuitry, and/or logic circuitry, data storage device(s)/register(s) storing any associated operational instructions can be embedded within, or external to, the circuitry comprising the state machine, analog circuitry, digital circuitry, and/or logic circuitry.

The memory 704/804 (as well as any other memory discussed herein) may include any type of computer-readable media. For example, one or more computer-readable media may include one or more volatile data storage devices, non-volatile data storage devices, removable data storage devices, and/or nonremovable data storage devices implemented using any technology, layout, and/or data structure(s)/protocol, including any suitable or desirable computer-readable instructions, data structures, program modules, or other data types. One or more computer-readable media that may include, but is not limited to, phase change memory, static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other medium that may be used to store information for access by a computing device. As used in certain contexts herein, computer-readable media may not generally refer to communication media, such as modulated data signals and carrier waves. As such, computer-readable media should generally be understood to refer to non-transitory media.

Figure 9:
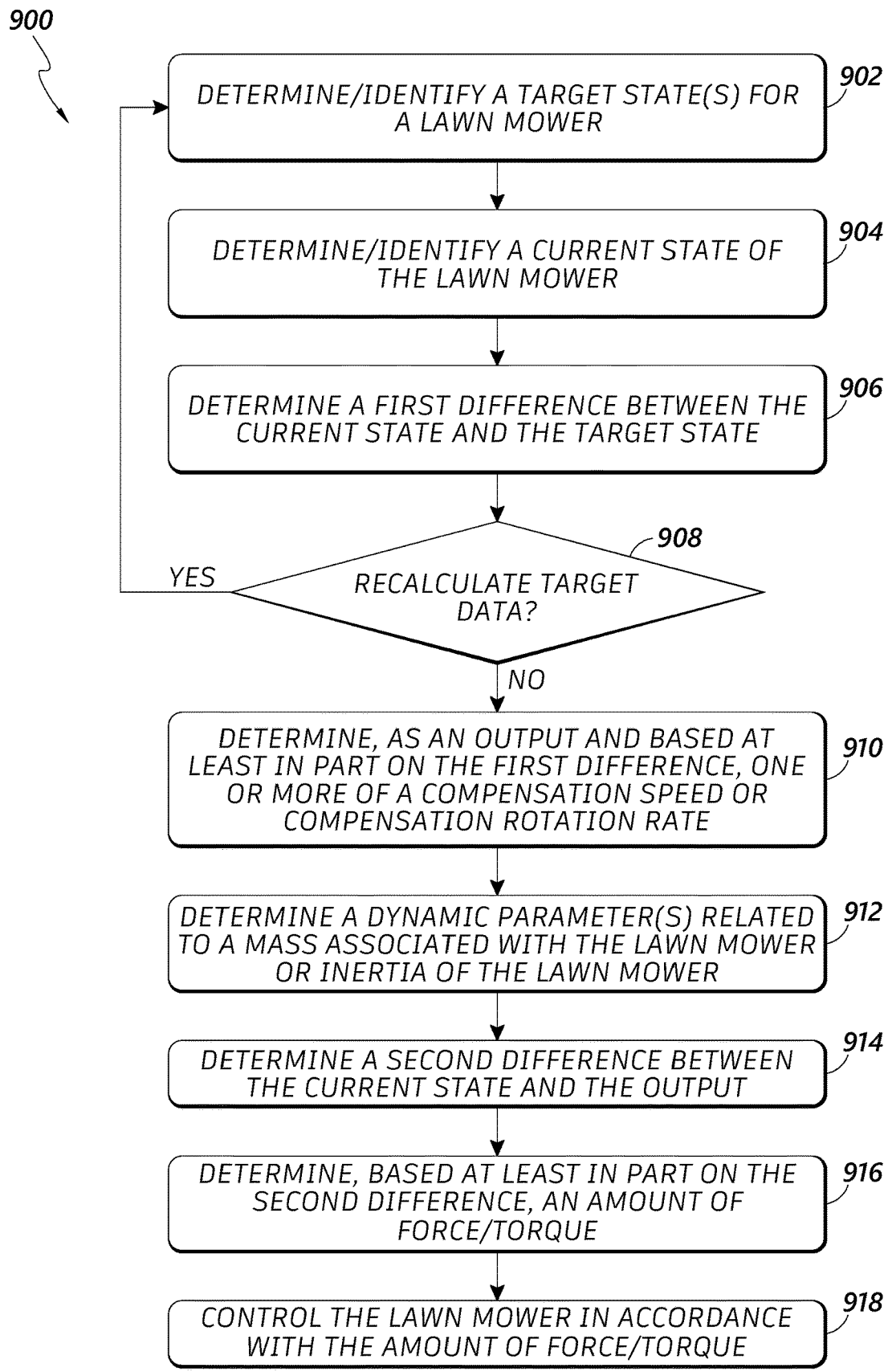
FIG. 9 illustrates an example process for controlling/adjusting movement of a lawn mower to cause the lawn mower to follow/return to a target trajectory.
Figure 10:
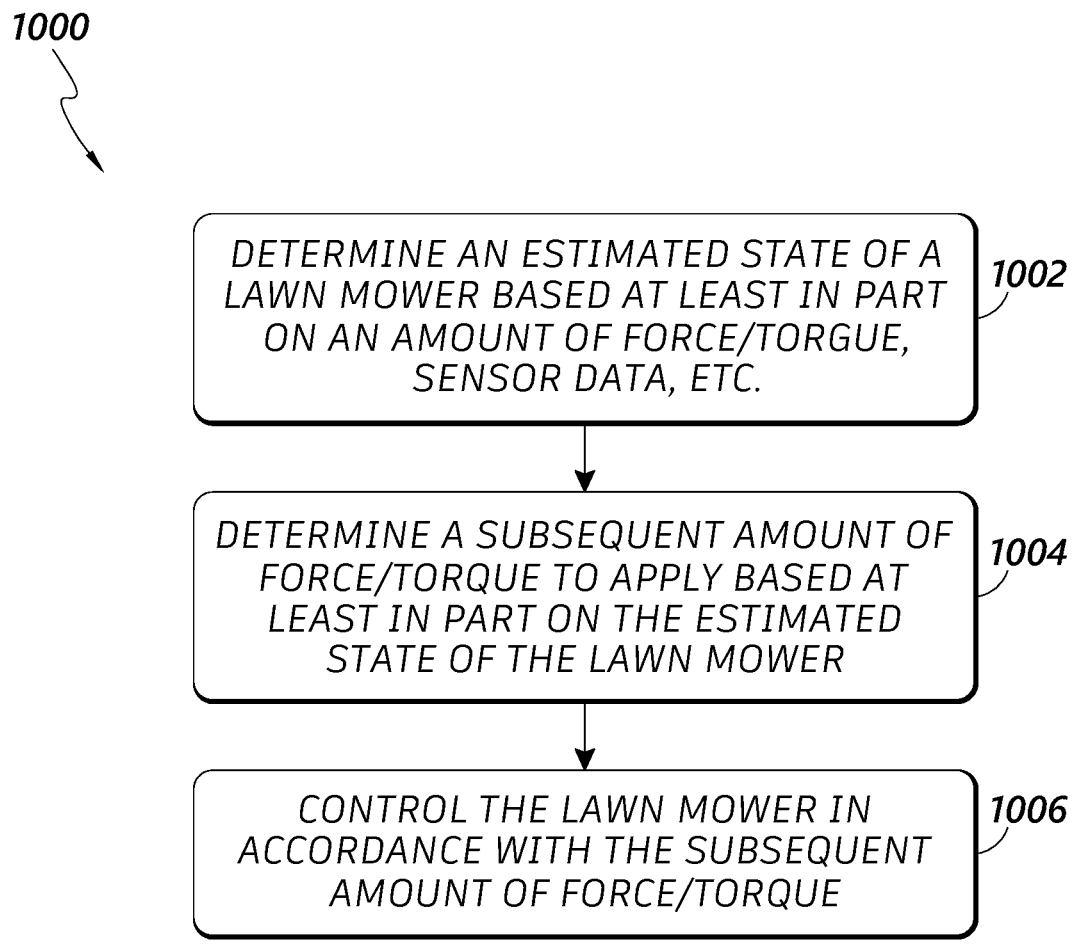
FIG. 10 illustrates an example process for determining an estimated state of a lawn mower and controlling/adjusting movement of the lawn mower based on the estimated state.

FIGS. 9 and 10 illustrate example processes 900 and 1000 for perform various operations discussed herein. In examples, the processes 900 and/or 1000 may be performed by one or more of the devices/components discussed herein, such as by the lawn mower 102, the computing resource(s) 104, and/or another device/component. In some cases, the processes 900 and/or 1000 can be performed by the processing circuitry 702/802. However, the processes 900 and/or 1000 can be performed in other architectures.

The processes 900 and/or 1000 (as well as each process described herein) is illustrated as a logical flow graph, each graph of which represents a sequence of operations that can be implemented in hardware, software, or a combination thereof. In the context of software, the operations represent executable instructions stored on one or more computer-readable media that, when executed by processing circuitry, perform the recited operations. Generally, executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement a process. Further, any number of the described operations may be omitted.

FIG. 9 illustrates the example process 900 for controlling/adjusting movement of a lawn mower to cause the lawn mower to follow/return to a target trajectory.

At 902, the process 900 includes determining/identifying one or more target state for a lawn mower. For example, the planner 302 can be determine one or more target states for the lawn mower 102 and/or generate target data indicating the one or more target states. A target state can indicate/include a target position, a target orientation, a target linear speed, and/or a target rotational rate (e.g., rotational speed). In examples, a position and orientation can be referred to as a pose. One or more of the elements of the target data can indicate/represent a target trajectory. Further, in examples the lawn mower 102 can be implemented as an autonomous lawn mower, such as when an autonomous mode is set.

At 904, the process 900 includes determining/identifying a current state of the lawn mower. For example, the state determination component 304 can determine a current state of the lawn mower 102 based at least in part on a control signal from the controller 306, sensor data from one or more sensors of the lawn mower 102, and/or other data/information. The current state can indicate/include a current position, a current orientation, a current speed (e.g., linear speed), and/or a current rotational rate (e.g., rotational speed). The state determination component 304 can generate state data indicating the current state of the lawn mower 102.

At 906, the process 900 includes determining a first difference between a current state and the target state. For example, the controller 306 can compare one or more parameters/values indicated in state data received from the state determination component 304 with one or more parameters/values indicated in target data from the planner 302 and determine any differences/error between the one or more state parameters and the one or more target parameters.

At 908, the process 900 includes determining whether to recalculate target data. For example, the planner 302 can determine if there is more than a threshold amount of difference between the one or more state parameters and the one or more target parameters. This can include comparing an individual difference in parameters to individual thresholds and/or comparing a collective/combined difference in parameters to a threshold. For example, the planner 302 can determine to recalculate target data if the lawn mower 102 is positioned outside a threshold distance to a target position, the lawn mower 102 is oriented differently by more than a threshold amount to a target orientation, the lawn mower 102 has a current velocity that is less/more than a threshold amount from a target velocity, and so on.

If it is determined to recalculate target data, the process 900 can return to block 902 (e.g., the YES branch) to determine a new/updated target data for the lawn mower. In contrast, if it is determined to not recalculate target data, the process 900 can proceed to block 910 (e.g., the NO branch).

Although the block 908 is illustrated in FIG. 9, in some instances the block 908 is eliminated and the process 900 proceeds from block 906 to block 910.

At 910, the process 900 includes determining, as an output and based at least in part on the first difference, one or more of a compensation speed or compensation rotational rate. For example, the controller 306 can implement one or more algorithms/techniques to determine, based on the first difference, the compensation speed and/or the compensation rotational rate (e.g., rotational speed) for returning the lawn mower 102 to a target state. The controller 306 can generate output data indicating the compensation speed and/for the compensation rotational rate.

In examples, the operations/acts of blocks 906 and/or 910 are performed by the kinematics component 402 of the controller 306. In some cases, the kinematics component 402/the controller 306 can implement an algorithm that is stable using the Lyapunov function.

At 912, the process 900 includes determining one or more dynamic parameters related to a mass associated with the lawn mower and/or inertia of the lawn mower. For example, the controller 306 can determine, while the lawn mower 102 is operating/in use within an environment, one or more dynamic parameters/values, which can be composite parameters that are based on other parameters. A dynamic parameter can relate to/be based on information/data that is determined in real time, such as by one or more sensors of the lawn mower 102, data input by a user, etc.

At 914, the process 900 includes determining a second difference between the current state and the output. For example, the controller 306 can compare one or more parameters/values indicated in the state data received from the state determination component 304 with one or more parameters/values indicated in output data (e.g., generated by the kinematics component 402) and determine any difference/error between the one or more state parameters and the one or more output parameters. To illustrate, the controller 306 can determine a difference between a compensation speed and a current speed of the lawn mower 102 and/or determine a difference between a compensation rotational rate and current rotational rate of the lawn mower 102.

At 916, the process 900 includes determining, based at least in part on the second difference, an amount of force/torque. For example, the controller 306 can use the dynamic parameter(s) determined at block 912 and/or the second difference/error determined at block 914 to determine an amount of force/torque for the drive unit 308 to implement/apply to control movement of the lawn mower 102. The controller 306 can generate a control signal indicating the amount of force/torque. In examples, the amount of force/torque causes the lawn mower 102 to exponentially converge to a target state.

In one non-limiting example, the controller 106 can be configured to determine the control signal using one or more of the equations discussed herein. For instances, the controller 106 can use the following equation to determine an amount of force/torque:

$$\tau = \mathcal{P}(q_s)^{-1}[\dot{q}_d - \mathcal{A}(q_s)a - \mathcal{K}(q_s)(q_s - q_d)] \quad (23)$$

Here, the controller 106 can be configured to determine a derivative of a desired state vector (e.g., $\dot{q}_d$). The desired state vector can be based on/include the compensation data (e.g., linear velocity and/or rotational rate). Thus, the derivative can be represented as shown below:

$$\dot{q}_d = [\dot{v}_d \, \dot{\omega}_d]^T \quad (24)$$

The controller 106 can multiply a state matrix and a dynamic parameter to obtain a first product. The state matrix can be based on state data (e.g., second state data for the lawn mower 102). In some instances, the state matrix is represented as shown below:

$$\mathcal{A}(q_s) = \begin{bmatrix} 0 & \omega_s^2 \\ -v_s\omega_s & 0 \end{bmatrix} \quad (25)$$

Further, in some instances, the dynamic parameter is represented as shown below:

$$a = [a_1 \, a_4]^T \quad (26)$$

The controller 106 can multiply a gain matrix and a first difference of a current state vector (e.g., $q_s$) and the desired state vector (e.g., $q_d$) to obtain a second product. The current state vector can be based on state data for the lawn mower 102. In some instances, the gain matrix is represented as shown below:

$$\mathcal{K}(q_s) = \begin{bmatrix} k_v & 0 \\ 0 & k_\omega \end{bmatrix} \quad (27)$$

The controller 106 can subtract the first product and the second product from the derivative of the desired state vector to obtain a second difference. The controller 106 can then multiply an inverse of a dynamic parameter function (e.g., $\mathcal{B}(q_s)^{-1}$) and the second difference to obtain a third product. In some instances, the dynamic parameter function is represented as shown below:

$$\mathcal{B} = \begin{bmatrix} a_2 & a_3 \\ a_5 & -a_6 \end{bmatrix} \quad (28)$$

The controller 106 can determine an amount of torque/force based on the third product. The control signal can indicate the amount of torque/force.

In examples, the operations/acts of blocks 912, 914, and/or 916 are performed by the dynamic component 404 of the controller 306. The dynamic component 404/the controller 306 can implement an algorithm that is configured to exponentially converge a current state of the lawn mower 102 to a target state. Further, the dynamic component 404/the controller 306 can implement an algorithm that is stable using contraction analysis (e.g., a contraction analysis algorithm).

At 918, the process 900 includes controlling the lawn mower in accordance with the amount of force/torque. For example, the controller 306 can provide/send the control signal to the drive unit 308 to cause movement of the lawn mower 102. The drive unit 308 can implement/apply the amount of force/torque indicated in the control signal to one or more wheels/movement members or otherwise generate the appropriate signals based on the control signal to control the one or more wheels/movement members.

FIG. 10 illustrates the example process 1000 for determining an estimated state of a lawn mower and controlling/adjusting movement of the lawn mower based on the estimated state. In examples, the process 1000 can be performed after the process 900 of FIG. 9 has been performed. However, the process 1000 can be performed at any time.

At 1002, the process 1000 includes determining an estimated state of a lawn mower based at least in part on an amount of force/torque, sensor data, and/or other data. For example, the state determination component 304 can determine an estimated current state of the lawn mower 102 based on a control signal from the controller 306 that indicates an amount of force/torque (for controlling movement of the lawn mower 102), sensor data from one or more sensors of the lawn mower 102, and/or other components associated with the lawn mower 102.

At 1004, the process 1000 includes determining a subsequent amount of force/torque to apply based at least in part on the estimated state of the lawn mower. For example, the controller 306 can perform one or more of the operations discussed in reference to process 900 from FIG. 9 to determine an amount of force/torque and/or generate a control signal indicating the amount of force/torque.

At 1006, the process 1000 includes controlling the lawn mower 102 in accordance with the subsequent amount of force/torque. For example, similar to block 918 of FIG. 9, the controller 306 can provide/send the control signal to the drive unit 308 to cause movement of the lawn mower 102 and/or the drive unit 308 can implement/apply the subsequent amount of force/torque indicated in the control signal.

The above description is not intended to be exhaustive or to limit the disclosure to the precise form disclosed above. While specific examples are described above for illustrative purposes, various equivalent modifications are possible within the scope of the disclosure, as those skilled in the relevant art will recognize. For example, while processes or blocks are presented in a given order, alternative examples may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel and/or at different times.

In examples, certain ordinal terms (e.g., "first" or "second") may be provided for ease of reference and do not necessarily imply physical characteristics or ordering. Therefore, as used herein, an ordinal term (e.g., "first," "second," "third," etc.) used to modify an element, such as a structure, a component, an operation, etc., does not necessarily indicate priority or order of the element with respect to any other element, but rather may generally distinguish the element from another element having a similar or identical name (but for use of the ordinal term). In addition, as used herein, articles ("a" and "an") may indicate "one or more" rather than "one." Further, an operation performed "based on" a condition or event may also be performed based on one or more other conditions or events not explicitly recited. In some contexts, description of an operation or event as occurring or being performed "based on," or "based at least in part on," a stated event or condition can be interpreted as being triggered by or performed in response to the stated event or condition.

With respect to the various methods and processes disclosed herein, although certain orders of operations or steps are illustrated and/or described, the various steps and operations shown and described may be performed in any suitable or desirable temporal order. Furthermore, any of the illustrated and/or described operations or steps may be omitted from any given method or process, and the illustrated/described methods and processes may include additional operations or steps not explicitly illustrated or described.

In the above description, various features are sometimes grouped together in a single example, figure, or description thereof for the purpose of streamlining the disclosure and aiding in the understanding of one or more of the various aspects of the disclosure. This method of disclosure, however, is not to be interpreted as reflecting an intention that any claim require more features than are expressly recited in that claim. Moreover, any components, features, or steps illustrated and/or described in a particular example herein can be applied to or used with any other example(s). Further, no component, feature, step, or group of components, features, or steps are necessary or indispensable for each example. Thus, it is intended that the scope of the disclosure should not be limited by the particular examples described above.

The one or more example discussed herein are used herein to illustrate one or more aspects, one or more features, and/or one or more concepts. A physical embodiment of an apparatus, an article of manufacture, a machine, and/or of a process may include one or more of the aspects, features, concepts, examples, etc. described with reference to one or more of the examples discussed herein. Further, from figure to figure, the examples may incorporate the same or similarly named functions, steps, modules, etc. that may use the same, related, or unrelated reference numbers. The relevant features, elements, functions, operations, modules, etc. may be the same or similar functions or may be unrelated.

Example Clauses

Example A: An autonomous lawn mower comprising: a planner configured to generate target data indicating a target state for the autonomous lawn mower; a kinematics component configured to: receive the target data from the planner; receive first state data indicating a current state of the autonomous lawn mower, the current state including at least one of a current position, a current orientation, a current speed, or a current rotational rate; determine that the current state of the autonomous lawn mower is different than the target state; and generate compensation data indicating one or more of a compensation speed or a compensation rotational rate; and a dynamic component configured to: receive the compensation data from the kinematics component; receive second state data; and based at least in part on the compensation data and the second state data, determine a control signal for controlling movement of the autonomous lawn mower to reach the target state; and a drive unit configured to control movement of the autonomous lawn mower based at least in part on the control signal.

Example B: The autonomous lawn mower of Example A, wherein the autonomous lawn mower further comprises a state estimation component configured to update the first state data based at least in part on the control signal.

Example C: The autonomous lawn mower of Example A or B, wherein the kinematic component is configured to generate the compensation data based at least in part on a difference of the target data and the first state data.

Example D: The autonomous lawn mower of any of Examples A through C, wherein the dynamic component is configured to determine the control signal based at least in part on a difference of the compensation data and the second state data.

Example E: The autonomous lawn mower of any of Examples A through D, wherein the second state data indicates the current speed and the current rotational rate.

Example F: The autonomous lawn mower of any of Examples A through E, wherein the dynamic component is configured to determine the control signal by: determining a derivative of a desired state vector, the desired state vector being based at least in part on the compensation data; multiplying a state matrix and a dynamic parameter to obtain a first product, the state matrix being based at least in part on the second state data; multiplying a gain matrix and a first difference of a current state vector and the desired state vector to obtain a second product, the current state vector being based at least in part on the second state data; subtracting the first product and the second product from the derivative of the desired state vector to obtain a second difference; multiplying an inverse of a dynamic parameter function and the second difference to obtain a third product;

and determining an amount of torque based at least in part on the third product; wherein the control signal indicates the amount of torque.

Example G: The autonomous lawn mower of any of Examples A through F, wherein that the planner is configured to: determine that the current position of the autonomous lawn mower is more than a threshold distance from the target state; and generate new target data based at least in part on the determination that the current position of the autonomous lawn mower is greater than or equal to the threshold distance from the target state.

Example H: The autonomous lawn mower of any of Examples A through G, further comprising: a dynamic parameter component configured to determine a dynamic parameter related to at least one of a mass associated with the autonomous lawn mower or inertia of the autonomous lawn mower; wherein the dynamic component is configured to determine the control signal based at least in part on the dynamic parameter.

Example I: A method comprising: receiving a target state for an autonomous lawn mower; determining a first difference between a first current state of the autonomous lawn mower and the target state, the first current state including at least one of a current position, a current orientation, a current speed, or a current rotational rate; determining, as compensation data and based at least in part on the first difference, one or more of a compensation speed or compensation rotational rate; determining a second difference between a second current state and the compensation data; determining, based at least in part on the second difference, an amount of torque; and controlling the autonomous lawn mower in accordance with the amount of torque.

Example J: The method of Example I, further comprising: determining an estimated state of the autonomous lawn mower based at least in part on the amount of torque; and determining a subsequent amount of torque to apply based at least in part on the estimated state of the autonomous lawn mower.

Example K: The method of Example I or J, wherein the determining the amount of torque includes: determining a derivative of a desired state vector; multiplying a state matrix and a dynamic parameter to obtain a first product, the state matrix being based at least in part on the second current state; multiplying a gain matrix and a first difference to obtain a current state vector and the desired state vector to obtain a second product, the current state vector being based at least in part on the second current state; subtracting the first product and the second product from the derivative of the desired state vector to obtain a second difference; multiplying an inverse of a dynamic parameter function and the second difference to obtain a third product; and determining the amount of torque based at least in part on the third product.

Example L: The method of any of Examples I though K, wherein the dynamic parameter is based on at least one of a mass associated with the autonomous lawn mower or inertia of the autonomous lawn mower.

Example M: The method of any of Examples I though L, wherein the second current state indicates the current speed and the current rotational rate.

Example N: A system comprising: processing circuitry; and memory communicatively coupled to the processing circuitry and storing executable instructions that, when executed by the processing circuitry, cause the processing circuitry to perform operations comprising: receiving a target state for an autonomous lawn mower; determining a first difference between a first current state of the autonomous lawn mower and the target state, the first current state including at least one of a current position, a current orientation, a current speed, or a current rotational rate; determining, as compensation data and based at least in part on the first difference, one or more of a compensation speed or compensation rotational rate; determining a second difference between a second current state and the compensation data; determining, based at least in part on the second difference, an amount of force; and controlling a drive unit of the autonomous lawn mower based at least in part on the amount of force.

Example O: The system of Example N, wherein the operations further comprise: determining an estimated state of the autonomous lawn mower based at least in part on the amount of force; determining a subsequent amount of force based at least in part on the estimated state of the autonomous lawn mower; and controlling the drive unit based at least in part on the subsequent amount of force.

Example P: The system of Example N or O, wherein the second current state includes the current speed and the current rotational rate.

Example Q: The system of any of Examples N through P, wherein the operations further comprise: determining, while the autonomous lawn mower is operating, a dynamic parameter related to at least one of a mass associated with the autonomous lawn mower or inertia of the autonomous lawn mower; wherein determining the amount of force is based at least in part on the dynamic parameter.

Example R: The system of any of Examples N through Q, wherein the target state indicates a target position, and the operations further comprise: determining that the autonomous lawn mower is located more than a threshold distance from the target position; and determining an updated target state for the autonomous lawn mower.

Example S: The system of any of Examples N through R, wherein the determining the amount of force is based at least in part on a rate of change of a desired state and an output of a dynamic parameter function determined based at least in part on the first current state.

Example T: The system of any of Examples N through S, wherein the target state indicates at least one of a target position, a target orientation, a target linear velocity, or a target rotational velocity.

What is claimed is:
1. An autonomous lawn mower comprising:
a planner configured to generate target data indicating a target state for the autonomous lawn mower;
a kinematics component configured to:
receive the target data from the planner;
receive first state data indicating a current state of the autonomous lawn mower, the current state including at least one of a current position, a current orientation, a current speed, or a current rotational rate;
determine a difference between the current state of the autonomous lawn mower and the target state;
determine that the difference is less than a threshold amount of difference; and
based at least in part on the determination that the difference is less than the threshold amount of difference, generate compensation data indicating one or more of a compensation speed or a compensation rotational rate;
a dynamic component configured to:
receive the compensation data from the kinematics component;
receive second state data; and based at least in part on the compensation data and the second state data, determine a control signal for controlling movement of the autonomous lawn mower to reach the target state; and a drive unit configured to control movement of the autonomous lawn mower based at least in part on the control signal.

2. The autonomous lawn mower of claim 1, wherein the autonomous lawn mower further comprises a state estimation component configured to update the first state data based at least in part on the control signal.

3. The autonomous lawn mower of claim 1, wherein the dynamic component is configured to determine the control signal based at least in part on a difference of the compensation data and the second state data.

4. The autonomous lawn mower of claim 1, wherein the second state data indicates the current speed and the current rotational rate.

5. The autonomous lawn mower of claim 1, wherein the dynamic component is configured to determine the control signal by:
    determining a derivative of a desired state vector, the desired state vector being based at least in part on the compensation data;
    multiplying a state matrix and a dynamic parameter to obtain a first product, the state matrix being based at least in part on the second state data;
    multiplying a gain matrix and a first difference of a current state vector and the desired state vector to obtain a second product, the current state vector being based at least in part on the second state data;
    subtracting the first product and the second product from the derivative of the desired state vector to obtain a second difference;
    multiplying an inverse of a dynamic parameter function and the second difference to obtain a third product; and
    determining an amount of torque based at least in part on the third product;
    wherein the control signal indicates the amount of torque.

6. The autonomous lawn mower of claim 1, wherein that the planner is configured to:
    determine that the current position of the autonomous lawn mower is more than a threshold distance from the target state; and
    generate new target data based at least in part on the determination that the current position of the autonomous lawn mower is greater than or equal to the threshold distance from the target state.

7. The autonomous lawn mower of claim 1, further comprising:
    a dynamic parameter component configured to determine a dynamic parameter related to at least one of a mass associated with the autonomous lawn mower or inertia of the autonomous lawn mower;
    wherein the dynamic component is configured to determine the control signal based at least in part on the dynamic parameter.

8. A method comprising:
    receiving a target state for an autonomous lawn mower;
    determining a first difference between a first current state of the autonomous lawn mower and the target state, the first current state including at least one of a current position, a current orientation, a current speed, or a current rotational rate;
    determining that the first difference is less than a threshold amount of difference;
    determining, as compensation data and based at least in part on the determination that the first difference is less than the threshold amount of difference, one or more of a compensation speed or compensation rotational rate;
    determining a second difference between a second current state and the compensation data;
    determining, based at least in part on the second difference, an amount of torque; and
    controlling the autonomous lawn mower in accordance with the amount of torque.

9. The method of claim 8, further comprising:
    determining an estimated state of the autonomous lawn mower based at least in part on the amount of torque; and
    determining a subsequent amount of torque to apply based at least in part on the estimated state of the autonomous lawn mower.

10. The method of claim 8, wherein the determining the amount of torque includes:
    determining a derivative of a desired state vector;
    multiplying a state matrix and a dynamic parameter to obtain a first product, the state matrix being based at least in part on the second current state;
    multiplying a gain matrix and a first difference of a current state vector and the desired state vector to obtain a second product, the current state vector being based at least in part on the second current state;
    subtracting the first product and the second product from the derivative of the desired state vector to obtain a second difference;
    multiplying an inverse of a dynamic parameter function and the second difference obtained from the subtracting to obtain a third product; and
    determining the amount of torque based at least in part on the third product.

11. The method of claim 10, wherein the dynamic parameter is based on at least one of a mass associated with the autonomous lawn mower or inertia of the autonomous lawn mower.

12. The method of claim 8, wherein the second current state indicates the current speed and the current rotational rate.

13. A system comprising:
    processing circuitry; and
    memory communicatively coupled to the processing circuitry and storing executable instructions that, when executed by the processing circuitry, cause the processing circuitry to perform operations comprising:
        receiving target data for an autonomous lawn mower, the target data indicating one or more target states;
        determining a first difference between a first current state of the autonomous lawn mower and the one or more target states, the first current state including at least one of a current position, a current orientation, a current speed, or a current rotational rate;
        based at least in part on the first difference, determining whether to recalculate the target data or provide compensation data to cause the autonomous lawn mower to realign with the one or more target states;
        in response to determining to recalculate the target data:
            determining new target data for the autonomous lawn mower; and
            controlling the autonomous lawn mower based at least in part on the new target data; and in response to determining to provide compensation data to cause the autonomous lawn mower to realign with the one or more target states:
  determining, as the compensation data and based at least in part on the first difference, one or more of a compensation speed or compensation rotational rate;
  determining a second difference between a second current state and the compensation data;
  determining, based at least in part on the second difference, an amount of force; and
  controlling a drive unit of the autonomous lawn mower based at least in part on the amount of force.

14. The system of claim 13, wherein the operations further comprise:
  determining an estimated state of the autonomous lawn mower based at least in part on the amount of force;
  determining a subsequent amount of force based at least in part on the estimated state of the autonomous lawn mower; and
  controlling the drive unit based at least in part on the subsequent amount of force.

15. The system of claim 13, wherein the second current state includes the current speed and the current rotational rate.

16. The system of claim 13, wherein the operations further comprise:
  determining, while the autonomous lawn mower is operating, a dynamic parameter related to at least one of a mass associated with the autonomous lawn mower or inertia of the autonomous lawn mower;
  wherein determining the amount of force is based at least in part on the dynamic parameter.

17. The system of claim 13, wherein the one or more target states indicate a target position.

18. The system of claim 13, wherein the determining the amount of force is based at least in part on a rate of change of a desired state and an output of a dynamic parameter function determined based at least in part on the first current state.

19. The system of claim 13, wherein the one or more target states indicate at least one of a target position, a target orientation, a target linear velocity, or a target rotational velocity.

* * * * *